United States Patent
Scholz et al.

(10) Patent No.: US 11,701,987 B2
(45) Date of Patent: Jul. 18, 2023

(54) ADJUSTMENT FITTING FOR A VEHICLE SEAT

(71) Applicant: Adient US LLC, Plymouth, MI (US)

(72) Inventors: Grit Scholz, Remscheid (DE); Kirubaharan Albert Reginold, Burscheid (DE); Balaji Paramasivam, Leverkusen (DE); Arkadius Rock, Solingen (DE); Daniel Hübner, Leverkusen (DE); Mothanna Yasen, Wermelskirchen (DE); Dieter Henkel, Remscheid (DE); Rolf Schüler, Heiligenhaus (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 17/595,110

(22) PCT Filed: May 8, 2020

(86) PCT No.: PCT/EP2020/062920
§ 371 (c)(1),
(2) Date: Nov. 9, 2021

(87) PCT Pub. No.: WO2020/229359
PCT Pub. Date: Nov. 19, 2020

(65) Prior Publication Data
US 2022/0212574 A1 Jul. 7, 2022

(30) Foreign Application Priority Data

May 10, 2019 (DE) ...................... 10 2019 112 345.3
Mar. 30, 2020 (DE) ...................... 10 2020 204 128.8

(51) Int. Cl.
*B60N 2/225* (2006.01)
*B60N 2/22* (2006.01)
*B60N 2/235* (2006.01)

(52) U.S. Cl.
CPC ......... *B60N 2/2227* (2013.01); *B60N 2/2251* (2013.01); *B60N 2/2258* (2013.01); *B60N 2/236* (2015.04)

(58) Field of Classification Search
CPC .. B60N 2/2251; B60N 2/1685; B60N 2/1892; B60N 2/2352; B60N 2/2258; B60N 2/2356; B60N 2/235
(Continued)

(56) References Cited

U.S. PATENT DOCUMENTS 5,588,932 A * 12/1996 Lindblad ............... B60N 2/2251
475/341
6,543,850 B1 * 4/2003 Becker ................. B60N 2/2254
297/362
(Continued)

FOREIGN PATENT DOCUMENTS

DE 10356614 A1 7/2005
DE 102006020751 A1 11/2007
(Continued)

OTHER PUBLICATIONS

European Patent Office, International Search Report and Written Opinion in Application No. PCT/EP2020/062920, dated Jul. 28, 2020, 11 pages, Rijswijk, Netherlands.

*Primary Examiner* — Sarah B McPartlin
(74) *Attorney, Agent, or Firm* — Marshall & Melhorn, LLC

(57) ABSTRACT

An adjustment fitting for a vehicle seat for adjusting an inclination of a backrest of the vehicle seat may have a first fitting part connectable to a seat substructure of the vehicle seat. The fitting may also have a second fitting part pivotable
(Continued)

about an axis relative to the first fitting part and connectable to the backrest of the vehicle seat. The first fitting part and the second fitting part may be constituent parts both of a gearing unit of the adjustment fitting and of a locking unit of the adjustment fitting.

11 Claims, 29 Drawing Sheets

(58) Field of Classification Search
USPC ....... 297/362, 366, 367, 367 R, 367 P, 367 L
See application file for complete search history.

(56) References Cited

U.S. PATENT DOCUMENTS

| | | | |
|---|---|---|---|
| 8,579,756 B2* | 11/2013 | Oki | B60N 2/168 475/300 |
| 2002/0033627 A1 | 3/2002 | Hoshihara et al. | |
| 2004/0251727 A1* | 12/2004 | Beneker | B60N 2/2251 297/362 |
| 2011/0169313 A1* | 7/2011 | Schulz | B60N 2/2251 297/362 |

FOREIGN PATENT DOCUMENTS

| | | |
|---|---|---|
| DE | 102007017672 A1 | 10/2008 |
| DE | 102009038735 A1 | 3/2011 |
| DE | 102011113747 A1 | 3/2013 |
| FR | 2873634 A1 | 2/2006 |
| FR | 2920713 A1 | 3/2009 |
| WO | 2012065721 A1 | 5/2012 |

* cited by examiner

ADJUSTMENT FITTING FOR A VEHICLE SEAT

FIELD

The invention relates to an adjustment fitting for a vehicle seat and to a vehicle seat.

BACKGROUND

DE 103 56 614 A1 discloses a seat having a seat part and having a backrest, wherein the backrest is rotatable relative to the seat part from a first position into a second position and is unlockable, and lockable at least in one of the positions, relative to the seat part, wherein the seat furthermore has a motor, and wherein both the unlocking of the backrest relative to the seat part and the rotation of the backrest from the first position into the second position are provided by means of the motor.

DE 10 2006 020 751 A1 discloses an adjustment fitting for a vehicle seat, wherein the adjustment fitting has a first fitting part and a second fitting part which is provided so as to be adjustable in rotation relative to said first fitting part about an axis of rotation by means of a gearing, wherein the gearing comprises a first toothing on the first fitting part and wherein the gearing comprises a second toothing, arranged eccentrically with respect to the first toothing, on the second fitting part, wherein two wedge segments are provided in order to ensure the eccentric arrangement of the first toothing relative to the second toothing. The wedge segments have an inner radius and an outer radius, wherein the adjustment fitting has a brake element and wherein the brake element has, in a radial direction proceeding from the axis of rotation, an extent that approximately corresponds to the outer radius of the wedge segments.

DE 10 2007 017 672 A1 has disclosed a vehicle seat having a first seat part, a second seat part which is adjustable relative to the first seat part, an electric motor for the electromotive adjustment of the two seat parts relative to one another, and a locking unit device for the locking unit of the seat parts relative to one another. It is provided that the locking unit device is unlockable by way of a first partial movement of the electric motor and the seat parts are adjustable relative to one another by way of a subsequent second partial movement of the electric motor, the electric motor rotates an adjustment means mounted on the first seat part and thereby generates a relative rotation between the adjustment means and the electric motor, in the first partial movement of the electric motor the electric motor is pivoted about the common axis of rotation and thereby unlocks the locking unit device, and in the second partial movement the electric motor is stationary and the adjustment means adjusts the second seat part.

DE 10 2009 038 735 A1 discloses an adjustment device for a vehicle component, in particular for the backrest of a vehicle seat, having a first fitting part and a second fitting part, which are arranged along an axis of rotation, wherein the relative position of the two fitting parts with respect to one another is variable by means of an eccentric which transmits a torque from a drive to the first fitting part such that the latter rolls on the second fitting part, and the eccentric comprises two eccentric means which are drivable by a driver which is arranged on the drive, and the eccentric comprises a spring means which acts between the two eccentric means. A brake means prevents a self-adjustment of the adjustment device. The brake means interacts with a projection on the first fitting part, the central axis of which extends parallel to the axis of rotation of the device.

WO 2012/065721 A1 discloses an adjustment device for a vehicle component, having a first fitting part and a second fitting part, which are arranged along an axis of rotation, wherein the relative position of the two fitting parts with respect to one another is variable by means of an eccentric which transmits a torque from a drive to a toothed wheel such that the latter rolls on the second fitting part, which eccentric preferably comprises two eccentric means, wherein the adjustment device has a brake means which at least substantially prevents the self-adjustment of said adjustment device, wherein the brake means interacts with a locking contour provided on the toothed wheel.

Adjustment fittings for vehicle seats, in particular backrest adjusters, are known from the prior art. Backrest adjusters known from the prior art have been developed and optimized for adjusting a backrest angle in a relatively small comfort adjustment range around a design position. An electrical adjustment function, which is increasingly used owing to an ever smaller installation space in newly developed vehicles between the vehicle seat and a B-pillar of the vehicles and the thus impeded accessibility to a handwheel for actuating the backrest adjuster, is configured for the adjustment imparted by the operator by actuation of a corresponding electrical switch. Here, the adjustment speed must be kept so low that the seat occupant is able, with the reaction speed available to them, to set a desired backrest angle without having to correct the backrest angle back and forth several times.

In view of ever-increasing demands on comfort, backrests of rear seat systems are also increasingly being electrified, wherein, in order to realize a larger load volume, these can also be adjusted fully forward or backward, preferably electrically by remote control or mobile phone app and at a significantly higher speed than in the case of pure comfort adjustments.

The further development of autonomous vehicles that is taking place in parallel furthermore requires an extended adjustment range of the vehicle seat used by a vehicle driver as an occupant, in order to also provide comfort for the vehicle driver, who is no longer constantly in control of the steering. With the simultaneous need to maintain occupant safety in the event of an accident, this means that the safety belt must be moved completely with the seat in order to lie closely against the occupant even when the seats or backrests have been positioned far rearward.

Such belt systems, the shoulder belt of which is therefore no longer fastened to the pillar so as to be fixed with respect to the vehicle body but is fastened in the upper region of the backrest, lead to significantly higher loads in the backrest adjuster (adjustment fitting) and consequently, in the case of an unchanged basic mechanical principle, require more installation space and more weight than backrest adjusters known from the prior art.

The problem addressed by the invention is that of providing an adjustment fitting for high loads and a vehicle seat having such an adjustment fitting.

The problem is solved according to the invention by an adjustment fitting having the features specified in patent claim 1. With regard to the vehicle seat, the problem is solved according to the invention by the features specified in patent claim 10.

The above-described new boundary conditions for electrical adjustment of the backrest angle give rise to new technical requirements as compared with adjustment fittings known from the prior art. On the one hand, the requirement for a very fast adjustment function that simultaneously exhibits excellent acoustic behavior means that wobble gearings known from the prior art, which exhibit system-induced torque fluctuations, are highly disadvantageous. Combined with the simultaneous demand for a significantly more frequent change of the backrest angle and the associated greater service life requirement, it is likewise the case that toothing geometries and bearing concepts known from the prior art reach limits that can physically scarcely be overcome. Furthermore, current wobble gearings and the meshing toothings thereof must be designed not only for the adjustment process but simultaneously for accommodating high loads in the event of a crash, which leads to considerable compromises in the development of the tooth geometries. The resulting problem of having to again accommodate drastically higher loads owing to the belt integration leads to conflicts of aims in the toothing and bearing design process which are so great that other operating principles imperatively have to be considered so as not to ultimately produce too expensive, large and heavy a product.

The problem is therefore solved according to the invention with an adjustment fitting for a vehicle seat, in particular for adjusting an inclination of a backrest of the vehicle seat, wherein the adjustment fitting comprises a first fitting part, which is connectable in particular to a seat substructure of the vehicle seat, and a second fitting part, which is pivotable about an axis relative to the first fitting part and which is in particular connectable to a backrest of the vehicle seat, and wherein the first fitting part and the second fitting part are constituent parts both of a gearing unit, for example of a planetary gearing, of the adjustment fitting and of a locking unit of the adjustment fitting.

One refinement provides that both the gearing unit and the locking unit are configured to mesh both with the first fitting part and with the second fitting part. A further aspect provides that a control mechanism is provided and is configured such that the meshing of the gearing unit and of the locking unit takes place centrally in a locking position. In particular, the gearing unit comprises the control mechanism, which is coupled to the gearing unit and to the locking unit such that, in a locking position of the adjustment fitting, both the gearing unit and the locking unit mesh with the fitting parts, in particular centrally. The control mechanism is designed, for example, as a control element arranged on a transmission element, in particular a control hollow cylinder or a control disk with a corresponding control external contour and with a retaining internal contour. The control element has a central point. The control external contour has, in particular, a cam contour for a radial fixing action. Alternatively, the control element may be designed as an eccentric.

For example, the locking unit is designed as an arrangement with 3 locking elements, wherein the three locking elements are locked centrally in the first and second fitting part by means of the control mechanism, in particular the control external contour. In particular, the control mechanism is configured and coupled in terms of movement to the levers such that, for the purposes of eliminating play, two of the three locking elements engage into the locking position, and are held there, in braced fashion. For this purpose, two of the locking elements are held so as to be braceable in opposite directions with respect to one another by means of a positioning spring. The control mechanism, in particular a partial region of the control external contour, is designed so as to fix the locking elements in the locking position.

Furthermore, the control mechanism, in particular a further partial region of the control outer contour, is designed such that, when actuated by the drive, said control mechanism or further partial region of the control outer contour actuates an unlocking mechanism for the locking unit both in the case of a movement clockwise and in the case of a movement counterclockwise. For example, the unlocking mechanism is designed or configured so as to release the locking unit, in particular the locking elements, when the control mechanism is moved by the drive out of the locking position both clockwise and counterclockwise. Here, the adjustment fitting is unlocked or opened and can be adjusted. For this purpose, the control mechanism and the unlocking mechanism are correspondingly coupled in terms of movement such that, when the control mechanism is actuated by the drive, both in the case of a movement clockwise and in the case of a movement counterclockwise, firstly the unlocking mechanism is actuated and releases the locking unit in order to unlock the adjustment fitting and enable the latter to be adjusted. The unlocking mechanism is for example of disk-shaped form with at least one or more unlocking contour(s). The unlocking contour(s) may be designed as internal and/or external contours. Such an unlocking mechanism with corresponding unlocking contours is also referred to as a guide with play, or slide.

Here, the gearing unit and the locking unit are formed separately from one another and are coupled to one another in terms of movement.

By virtue of the fact that the gearing unit and the locking unit are formed separately from one another, their functions are separated from one another and can be configured in correspondingly optimized fashion. This makes it possible in a simple manner for the locking unit to be configured such that an opening of the adjustment fitting in both directions proceeding from a locking position, as well as an optimum load distribution in the locking position, are made possible. Furthermore, the holding action in a set locking position is effected by means of both the locking unit and the gearing unit. This makes higher holding and locking unit loads possible.

One possible embodiment provides that the first fitting part has at least one first internal toothing and the second fitting part has at least one second internal toothing, wherein both the gearing unit and the locking unit are configured to engage both with the first internal toothing and with the second internal toothing. Such a configuration of the adjustment fitting, in particular in its locking position, allows high crash loads to be accommodated in a small installation space. Here, the gearing unit and the locking unit may each have two separate toothing stages. It is also possible for the locking unit and the gearing unit to have in each case different toothings in the toothed stages or toothed rings, for example not two but four toothed stages for four ring gear toothings, and thus in turn two stages in each toothed stage or each toothed ring. A further embodiment provides that the ring gear or internal toothings of the fitting parts are radially offset. For this purpose, the toothed stages or toothed rings of the locking unit and of the gearing unit are radially offset in an analogous manner.

The locking elements of the locking unit are in particular configured such that toothed segments mesh with the fitting parts over a large segment angle in the locking position, such that large forces can be accommodated.

The gearing unit is in particular configured to achieve good efficiency and good running behavior during the adjustment of the backrest.

In one possible embodiment, the gearing unit, designed for example as a planetary gearing, comprises at least one carrier, a locking element guide, toothed wheels, in particular planets, and associated bearing journals and the control mechanism. The first fitting part and the second fitting part may each act as a ring gear of the gearing unit, in particular of the planetary gearing.

In one possible embodiment, the locking unit comprises at least one unlocking unit, a number of locking elements and a number of play-eliminating elements, such as levers. A locking unit is to be understood as meaning in particular a locking between at least one radially guided locking element and a counterpart toothing. The first fitting part and the second fitting part may each act as a ring gear for the locking unit.

A further embodiment provides that, when the locking unit is open, the backrest is coupled to, for example is in tooth meshing engagement with, the seat substructure by means of the gearing unit. By contrast to commonly series-connected raster-type gearing solutions with rasters for quick adjustment, it is therefore the case in the solution proposed here that, when the locking unit is opened, the backrest is not free but remains connected to the seat substructure via the gearing unit.

A further aspect provides for a direct drive of the adjustment fitting. For example, the adjustment fitting may be characterized by a direct drive that is coupled to the gearing unit. Here, the drive is permanently coupled to the gearing unit. For example, such direct drive takes place via a transmission tube by means of which a drive torque is transmitted from a motor to the control mechanism. In particular, the planetary gearing is coupled directly to the motor, in particular the transmission element thereof. Such a configuration of the adjustment fitting allows a quick adjustment of the backrest and the use of only a single drive unit.

The configuration of the adjustment fitting, in particular of the locking unit, also with an opening movement in both directions of rotation, without the need for a separate component as an actuator to retract the toothed segments in always one direction of rotation, makes it possible for the adjustment in a desired direction of rotation of the backrest to be able to be motor-driven.

One refinement provides that the play-eliminating elements, in particular the levers, have a bracing contour and the locking elements have a cam, which enter into operative engagement such that an elimination of play is made possible. In one possible embodiment, the rotational movement of the drive in both directions may firstly cause the play-eliminating elements, for example the levers, with bracing contour to be pulled together, such that the locking elements are unlocked, wherein, with a similar further rotational movement in the same direction of rotation, the toothed wheels, in particular the planets, are subsequently driven, and the backrest is moved, in particular adjusted.

Through special geometrical design of the teeth of the toothed segments and the (mirrored) position of the toothed segments with respect to one another, the toothed segments of the locking elements are used in the above-described adjustment fitting to completely eliminate play of the adjustment fitting. Here, manufacturing tolerances are compensated for by bracing contours on the spring-preloaded levers mounted in the planet carrier by way of engagement of the toothed segments to different depths in combination with the movement of said toothed segments in the circumferential direction correspondingly to the position of the toothed rings of the fitting parts, without the need for the toothed ring fixed to the backrest of the fitting part fixed to the backrest to move relative to the toothed ring fixed to the seat of the fitting part fixed to the seat, that is to say the adjustment is continuously variable.

For example, the locking unit comprises a number of locking elements, each of which has at least two radial toothed rings which are arranged axially adjacent to one another. Here, the radial toothed rings may have an equal number of teeth. Alternatively, the radial toothed rings of a locking element may have different numbers of teeth. For example, the radial toothed ring of the respective locking element for meshing with the first internal toothing of the first fitting part comprises more teeth than the radial toothed ring for meshing with the second internal toothing of the second fitting part, or vice versa.

In particular, the respective locking element comprises a first radial toothed ring, which meshes with the first internal toothing in the locking position of the adjustment fitting, and a second radial toothed ring, which meshes with the second internal toothing in the locking position of the adjustment fitting.

Here, the radial toothed rings of the respective locking element may be configured such that, in the locking position of the adjustment fitting, only one tooth or a plurality, in particular a few teeth, for example two or three teeth, of the respective radial toothed ring mesh(es) in each case with the associated internal toothing in the engaged state. Furthermore, all tooth tips of the radial toothed rings of the respective locking element may be configured so as to have the same tip spacings as the ring gear toothing, in particular the internal toothings of the fitting parts, in order to allow meshing therewith or engagement therein. Alternatively, the tip spacings between the teeth of the respective radial toothed ring may be designed to be of different sizes. For example, the tip spacings between the teeth of the respective radial toothed ring may decrease outwardly as viewed from a centerline of the respective locking element. In other words: The tip spacings between the teeth become smaller proceeding from the centerline to the respective outside.

Furthermore, a spring-preloaded locking element guide (also referred to as a segment guide) may be provided for positioning the locking elements with respect to one another and for guiding the locking elements out of the locking position into a central initial or open position (also referred to as reset). Such positioning of the locking elements with respect to one another during the engagement of the locking elements into the locking position, in particular an enabled locking element movement in a circumferential direction combined with a tangential force component of the play-eliminating elements and of the control mechanism, avoids a possible tip-to-tip position.

A further aspect provides a locking element guide for controlling the engagement movement of the locking elements. The locking element guide is configured such that the locking elements are guided in radially and/or tangentially movable fashion. In particular, the locking elements are positively guided by means of the locking element guide without tilting, but with relative radial and/or tangential mobility. This allows pre-positioning before the locking elements engage into the locking position. The locking element guide is for example of ring-shaped or disk-shaped form. The locking element guide comprises, in particular for each locking element, a radial guide, in particular a radially extending groove or a radially extending slot. Here, the locking elements are held on the locking element guide in radially and/or tangentially movable fashion by means of fastening elements, in particular bow springs or clips. The locking element guide may have an internal contour for limiting the radial and/or tangential movement of the locking elements. The internal contour is in particular designed to correspond to the shape, size and/or the dimensions of the locking elements. In particular, the internal contour has a slightly larger form and/or slightly larger dimensions than the form or the dimensions of the locking elements.

For the positioning of the locking elements with respect to one another, the locking element guide comprises at least one positioning spring and/or one bracing element. For example, the locking element guide comprises an integrated bracing element with spring arms, by means of which the locking elements are held so as to be braceable in opposite directions to one another. Alternatively, the positioning spring and/or the bracing element may be formed separately.

The problem is furthermore solved by a vehicle seat having an adjustment fitting according to the invention. Such a vehicle seat can dissipate high loads from a backrest via the fitting into a seat substructure and nevertheless be of lighter weight and of lower cost than vehicle seats known from the prior art. The vehicle seat may have an integrated belt system. A fitting according to the invention is preferably arranged on that side of the seat on which a belt strap of the belt system also emerges from the backrest. A rotary bearing known from the prior art, a fitting known from the prior art or a further adjustment fitting according to the invention may be arranged on the other side of the vehicle seat.

In summary, and in other words, the invention lies in particular in the separation of the overall problem of achieving an "excellent setting function with simultaneously increased load-accommodating capacity" into different regions or operating principles which, within the product, optimally fulfil in each case one of the requirements simultaneously and in parallel.

For the function of "frequent, acoustically good adjustment", classic planetary gearings of substantially symmetrical construction are already well proven in many adjustment systems, including within vehicle seats. Such planetary gearings are used in particular for adjustment functions with more moderate crash load requirements, such as seat cushion inclination adjusters and the like. By contrast, detent-type fittings (detent-type backrest adjusters or "lever recliners") known from the prior art and equipped with detent locking means are excellently suited for the function of "accommodating high crash loads in a small installation space"; these, with their toothed rings, toothed segments, such as locking elements, and toothed segment guides, such as locking element guides, optimized for accommodating loads, and with an acceptable stepping configuration in a relatively small installation space and with a low weight, constitute a good selection for accommodating loads in seats with integral belts.

The invention combines these two known operating principles and allows one and/or the other mechanism to take effect optimally for the respectively present function during use, wherein, through skillful design and construction, various individual parts in both mechanisms may be used simultaneously, with the result that the overall outlay is lower than the sum of the individual outlays for the two mechanisms.

The adjustment fitting has a simple triggering and locking sequence, according to which a motor is coupled in terms of movement directly to the control mechanism of the adjustment fitting by means of a transmission element. The control mechanism has, for example, at least one control cam, in particular an external contour and/or projections, in particular cam-shaped contours and/or projections, which are operatively coupled to the play-eliminating elements, in particular with a wedge-shaped contour, such that the play-eliminating elements move the locking unit, in particular the locking elements, into the locking position and hold or block them there, wherein the control mechanism is additionally configured to block the locking elements in the locking position. For this purpose, the control mechanism has a corresponding blocking contour, in particular protruding blocking cams. For the unlocking of the locking elements, the adjustment fitting has an unlocking unit. The unlocking unit is for example of disk-shaped form with at least one or more unlocking contour(s). The unlocking contour(s) may be designed as internal and/or external contours. Here, the unlocking unit is configured and coupled to the control mechanism such that, when the control mechanism is actuated by the drive, both in the case of a movement clockwise and in the case of a movement counterclockwise, the unlocking unit releases the locking unit. The locking elements move out of the locking position and the adjustment fitting can be adjusted.

DESCRIPTION OF THE FIGURES

Exemplary embodiments of the invention will be discussed in more detail with reference to drawings, in which.

DETAILED DESCRIPTION

Parts which correspond to one another are denoted by the same reference designations in all figures.

Figure 1:
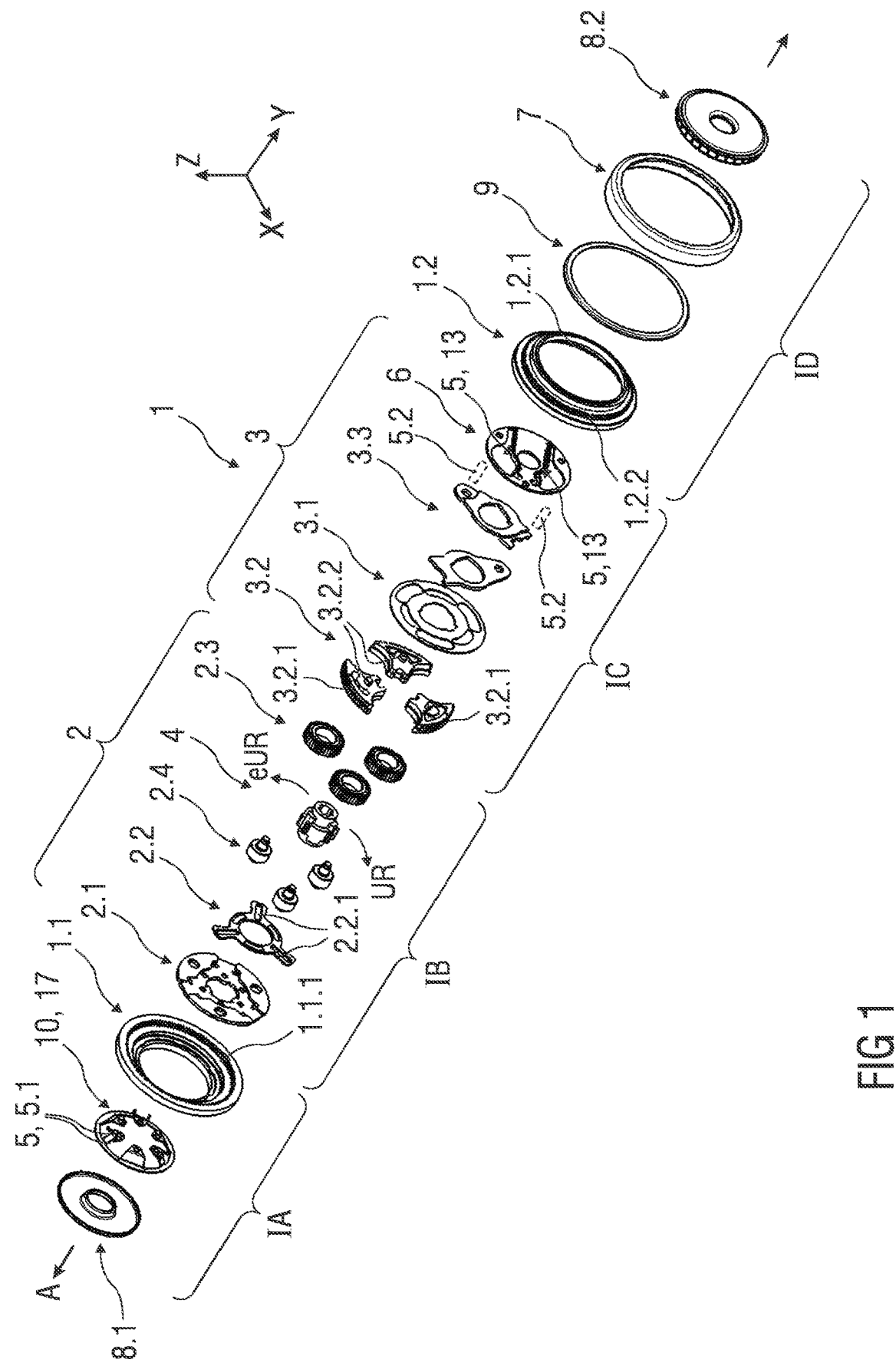
FIG. 1 schematically shows a view of an exploded illustration of an embodiment of an adjustment fitting, FIG. 1A schematically shows a partial view of the exploded illustrations according to FIG. 1, FIG. 1B schematically shows a partial view of the exploded illustrations according to FIG. 1, FIG. 1C schematically shows a partial view of the exploded illustrations according to FIG. 1, FIG. 1D schematically shows a partial view of the exploded illustrations according to FIG. 1, FIG. 2 schematically shows a view of an exploded illustration of an embodiment of an adjustment fitting, FIG. 2A schematically shows a partial view of the exploded illustrations according to FIG. 2, FIG. 2B schematically shows a partial view of the exploded illustrations according to FIG. 2, FIG. 2C schematically shows a partial view of the exploded illustrations according to FIG. 2, FIG. 2D schematically shows a partial view of the exploded illustrations according to FIG. 2, FIGS. 3A and 3B FIG. 3A schematically shows a view of an exploded illustration of a number of locking elements of a locking unit, FIG. 3B schematically shows a different view of an exploded illustration of a number of locking elements of a locking unit, FIG. 4 schematically shows a perspective view of an exemplary embodiment of a control mechanism, FIG. 5 schematically shows a perspective view of an exemplary embodiment of a gearing unit in the assembled state with one of the fitting parts of the adjustment fitting, FIG. 6 schematically shows an embodiment of a gearing setup of an adjustment fitting, FIG. 7 schematically shows a view of a backrest side of the adjustment fitting without a housing cover and with a carrier disk, FIG. 8 schematically shows a further view of a side of the adjustment fitting fixed to the backrest, without a housing cover and without a carrier disk, FIG. 9 schematically shows a perspective view of an embodiment of a locking element guide of an adjustment fitting, FIG. 10 schematically shows, in plan view, an embodiment of a combined gearing and locking unit of an adjustment fitting in the assembled state without a housing cover, FIG. 11 schematically shows a detail view of meshing of a locking element with the fitting parts in the locking position of the adjustment fitting, FIG. 12 schematically shows a sectional illustration of an adjustment fitting, FIG. 13 schematically shows, in a perspective representation, an assembled adjustment fitting on a vehicle seat, FIG. 14A schematically shows a perspective illustration of a covered adjustment fitting, FIG. 14B schematically shows a perspective illustration of a covered adjustment fitting, FIG. 15 schematically shows, in an exploded illustration, an alternative embodiment of a locking element guide of an adjustment fitting, FIG. 16 schematically shows, in the partially assembled state, an adjustment fitting in a perspective view, FIG. 17 schematically shows a general exemplary embodiment of a simple adjustment fitting with a separate gearing unit and locking unit, FIG. 18 schematically shows a general exemplary embodiment of a simple adjustment fitting with a separate gearing unit and locking unit, and FIG. 19 schematically shows a view of an alternative adjustment fitting with radially offset toothings for the gearing unit and the locking unit.
Figure 1A:
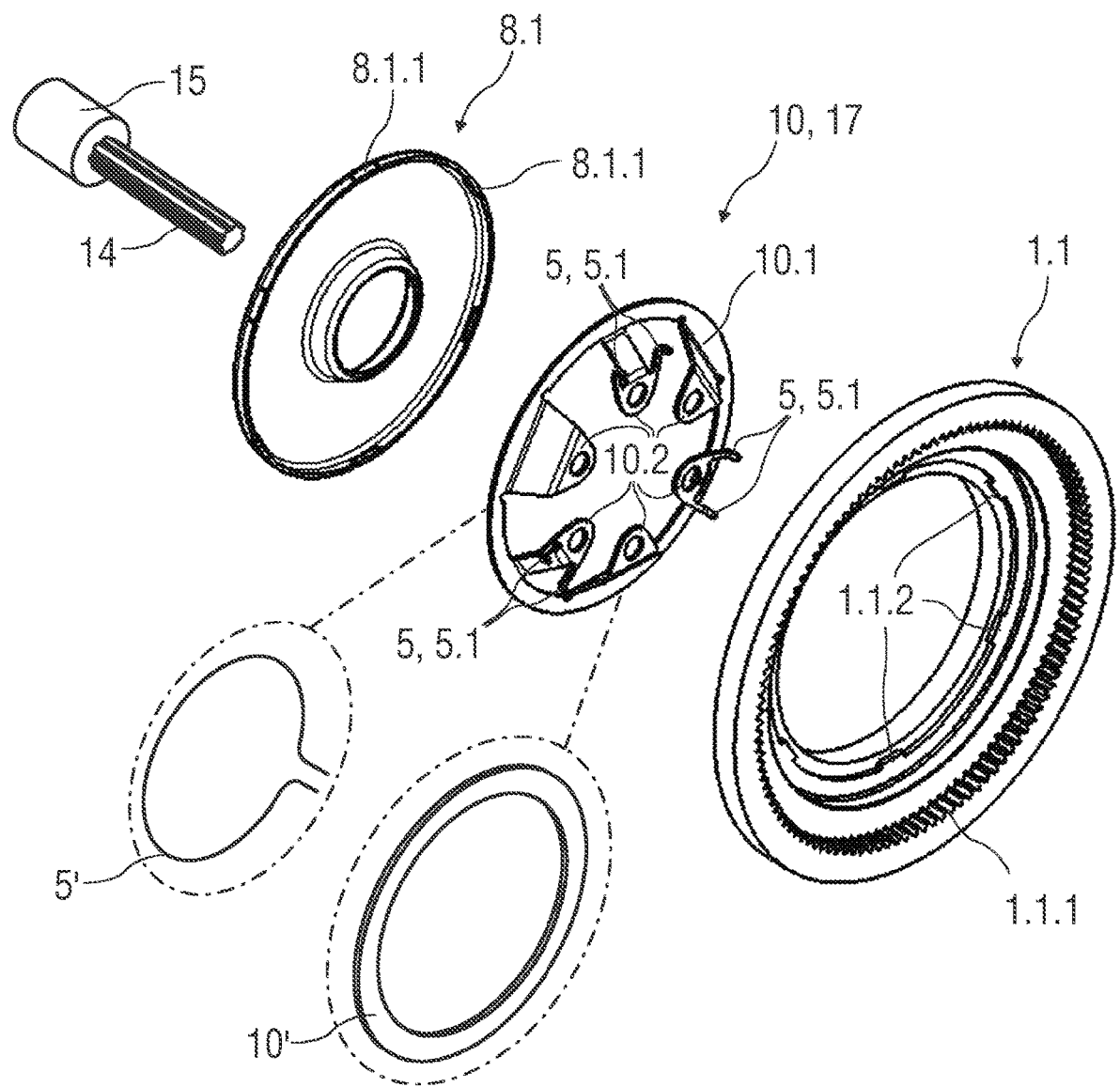
Figure 1B:
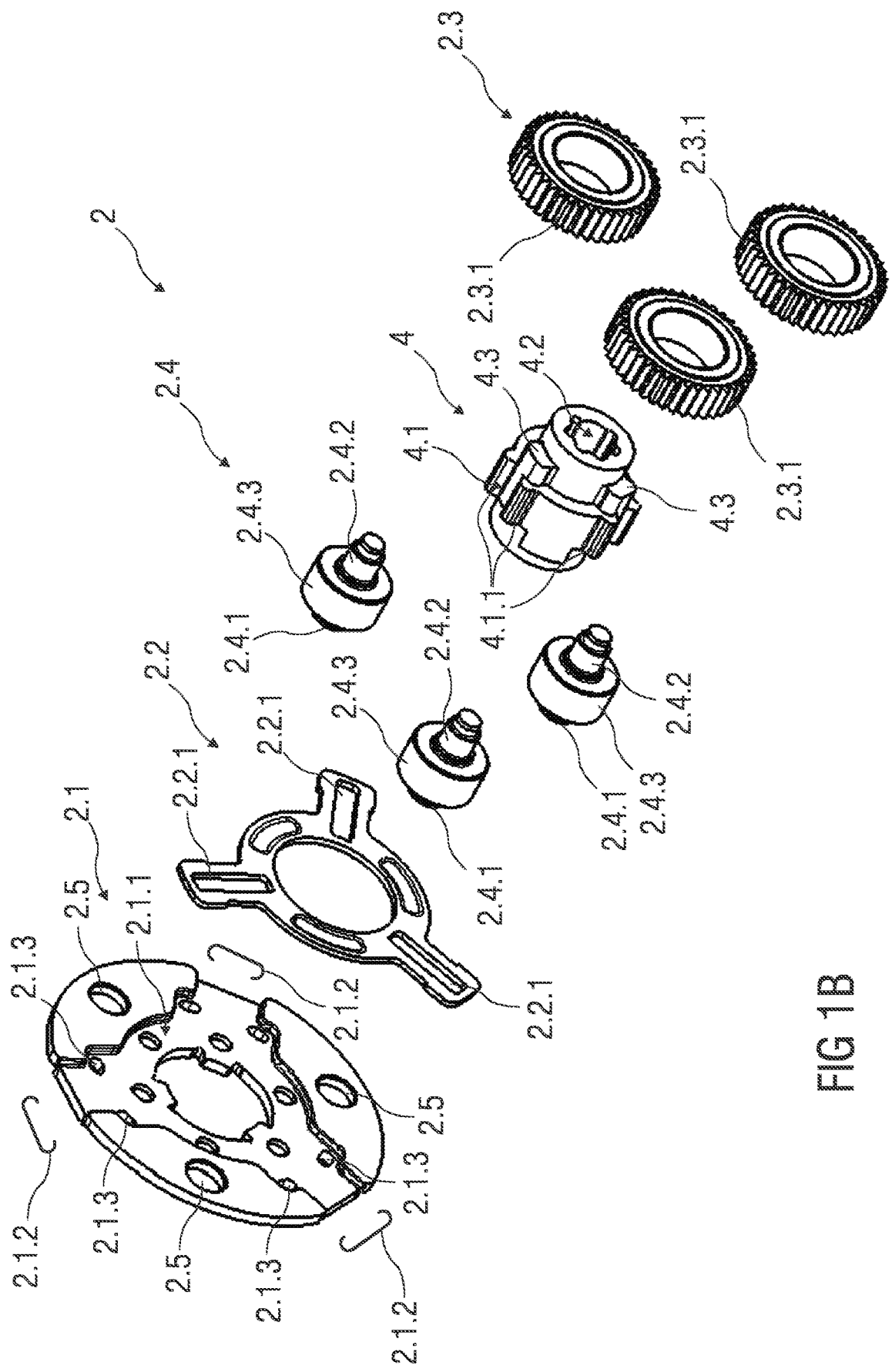
Figure 1C:
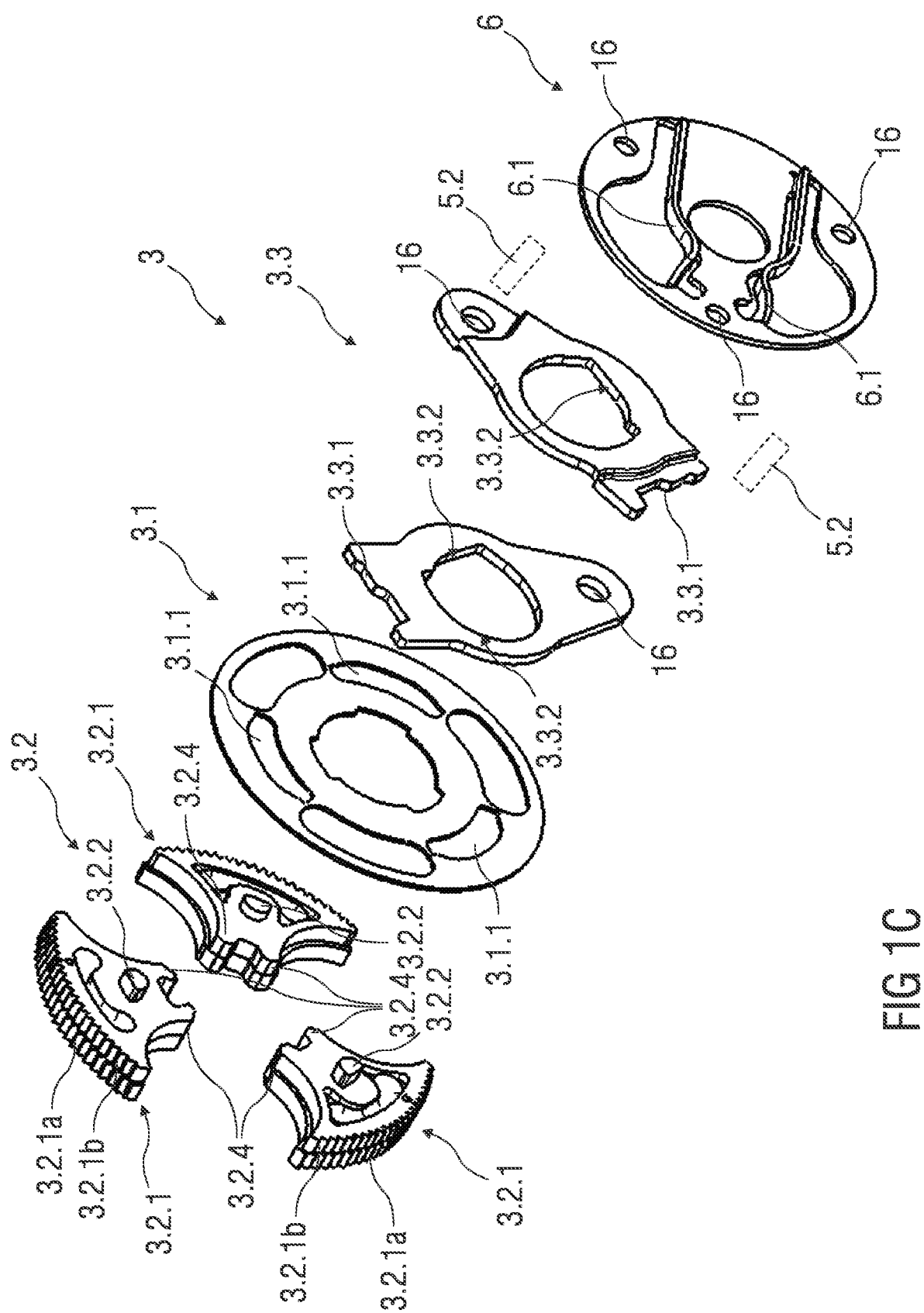
Figure 1D:
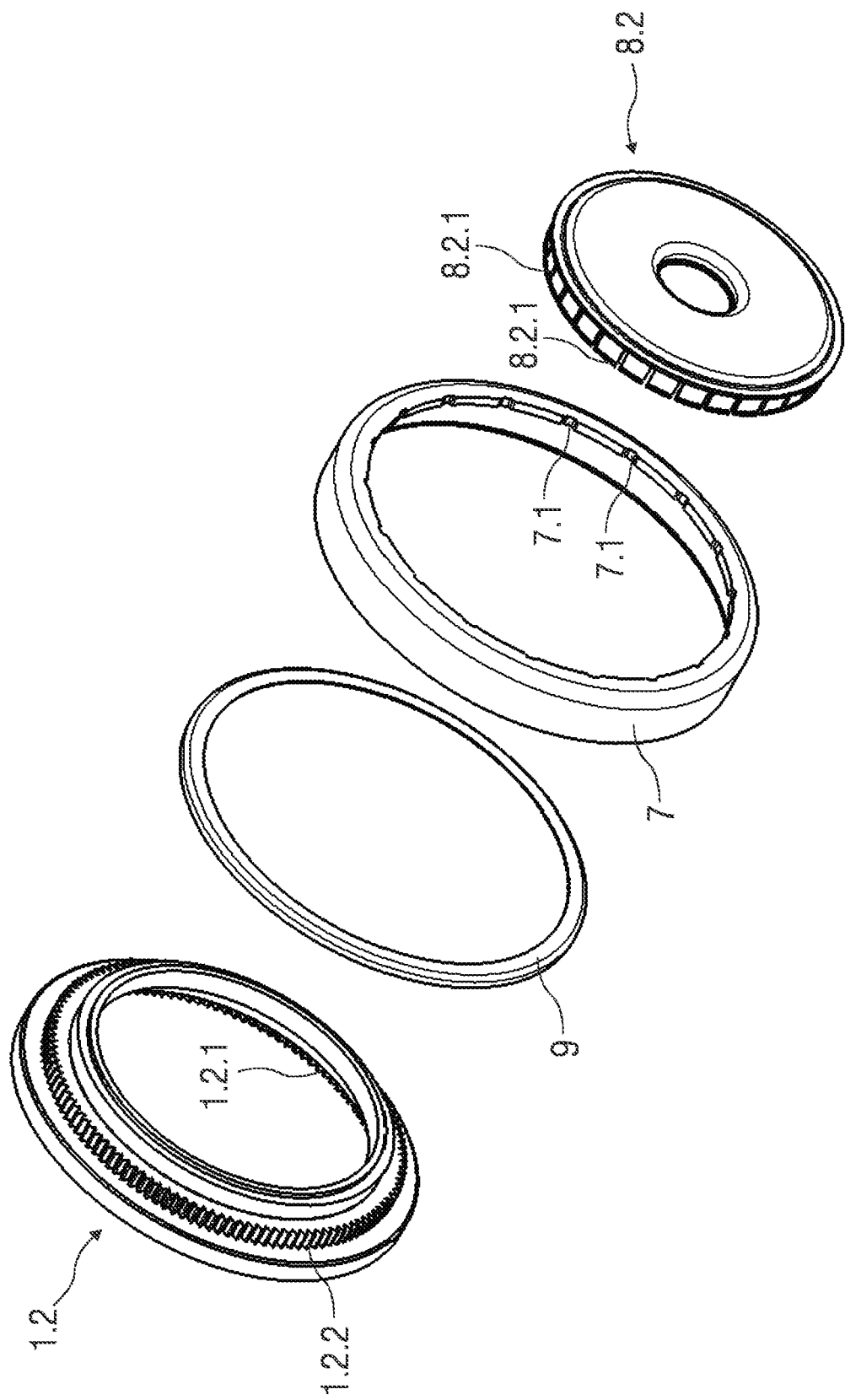
Figure 2:
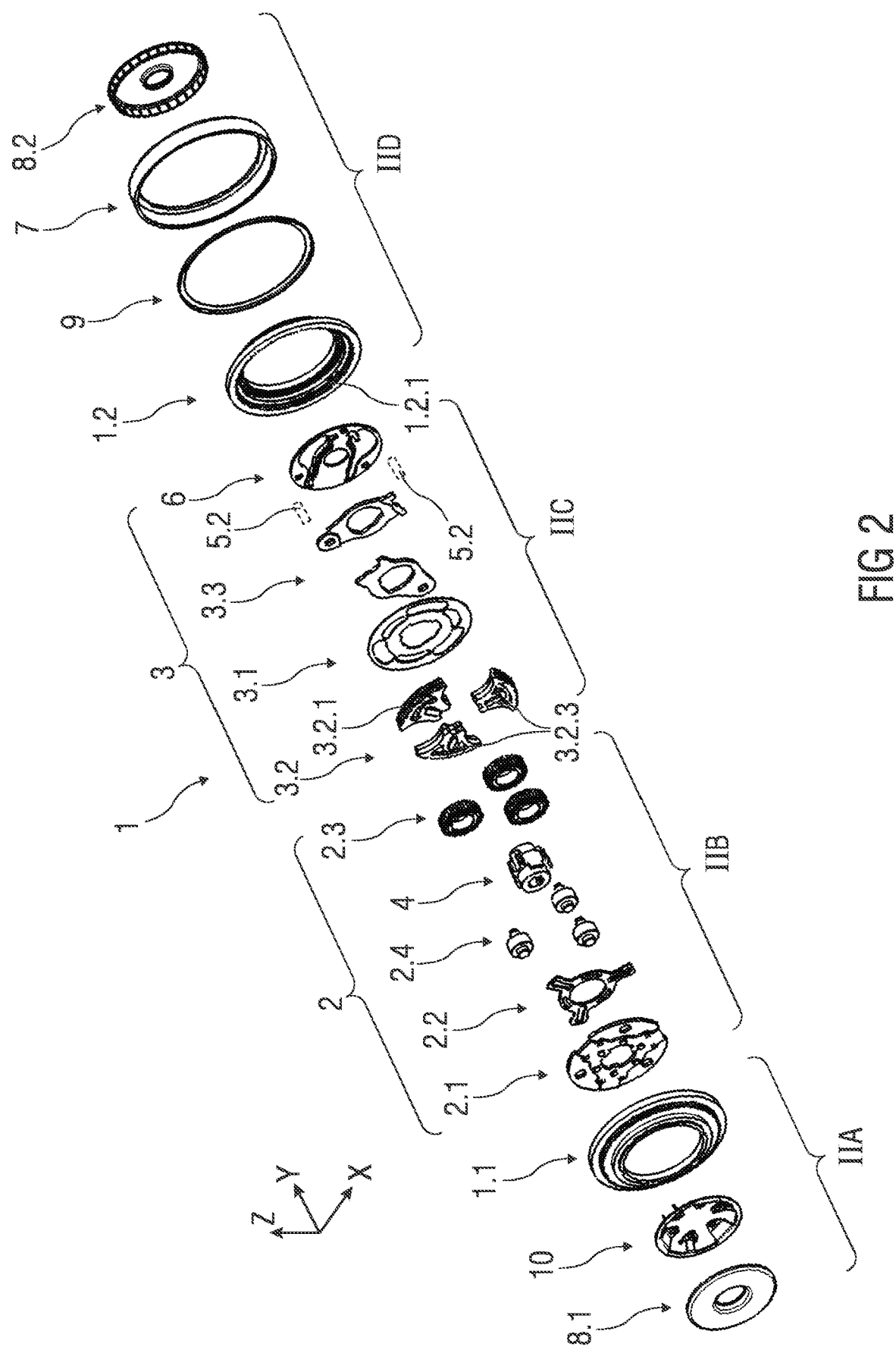

FIGS. 1 and 2 schematically show different views of an exploded illustration of a first embodiment of an adjustment fitting 1. The adjustment fitting 1 combines a gearing unit 2, which is designed as a geared fitting, and a locking unit 3. For better clarity and for detail views of components of the adjustment fitting 1, FIGS. 1A to 1D and 2A to 2D each schematically show partial views of the exploded illustrations according to FIGS. 1 to 2.

The adjustment fitting 1 has a first fitting part 1.1 and a second fitting part 1.2.

Figure 13:
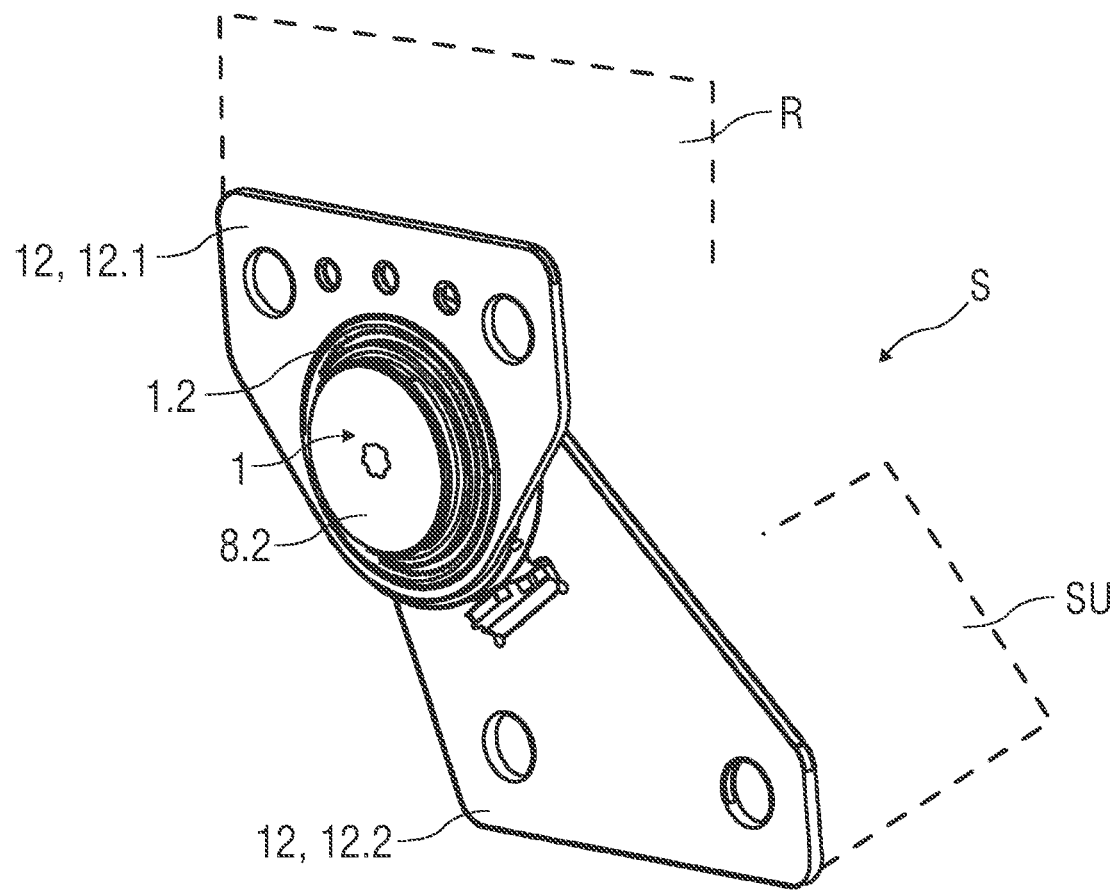

The adjustment fitting 1 serves for adjusting an inclination of a backrest R of a vehicle seat S (indicated in FIG. 13).

The first fitting part 1.1 is connectable to a seat substructure SU of the vehicle seat S (see FIG. 13). The second fitting part 1.2 is arranged about an axis A relative to the first fitting part 1.1. The second fitting part 1.2 is in particular connectable to the backrest R of the vehicle seat S (see FIG. 13).

The first fitting part 1.1 and the second fitting part 1.2 are constituent parts both of the gearing unit 2, for example of a planetary gearing, of the adjustment fitting 1 and of the locking unit 3 of the adjustment fitting 1.

Here, both the gearing unit 2 and the locking unit 3 are configured such that they each mesh both with the first fitting part 1.1 and with the second fitting part 1.2.

Figure 10:
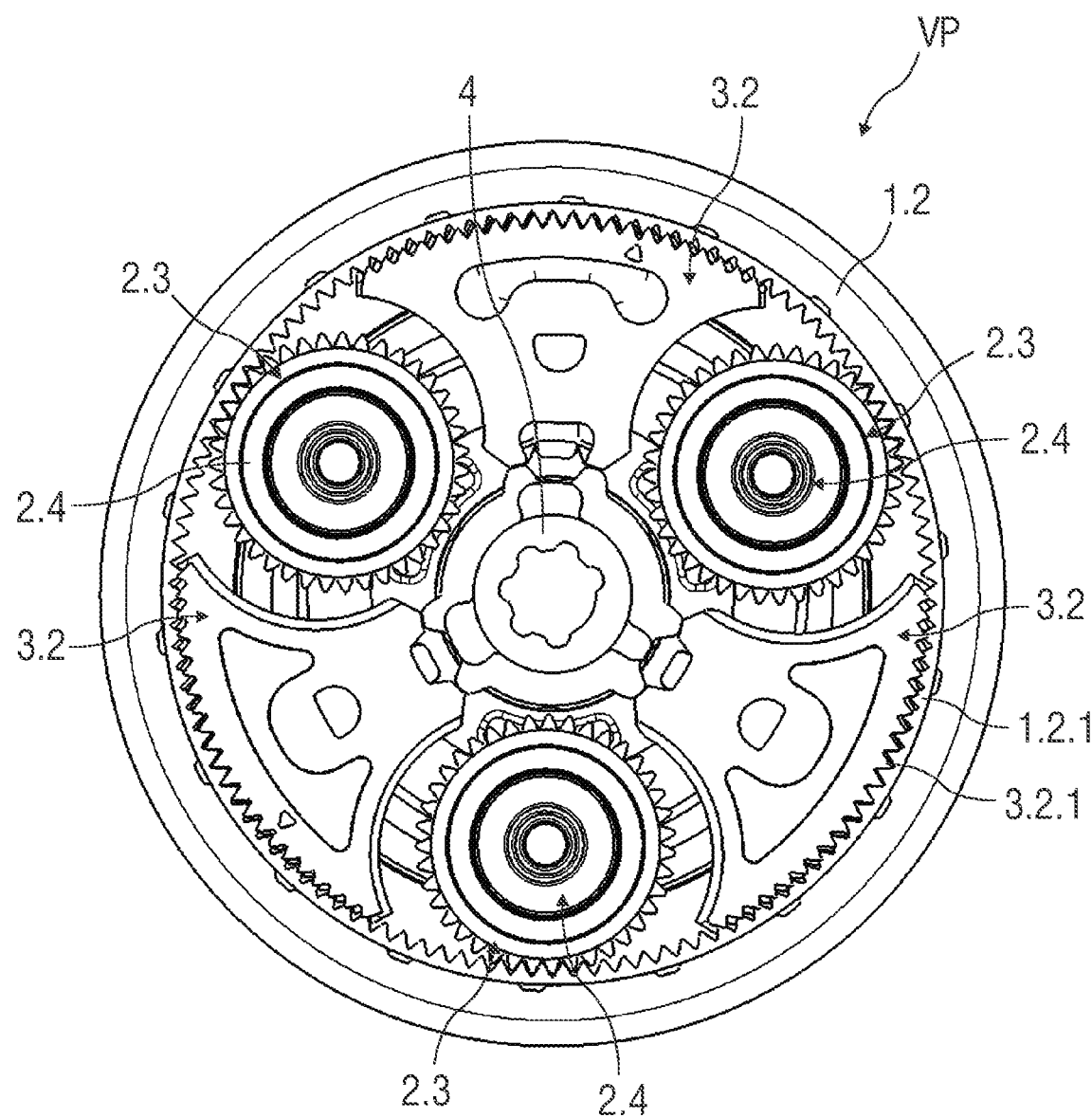
Figure 11:
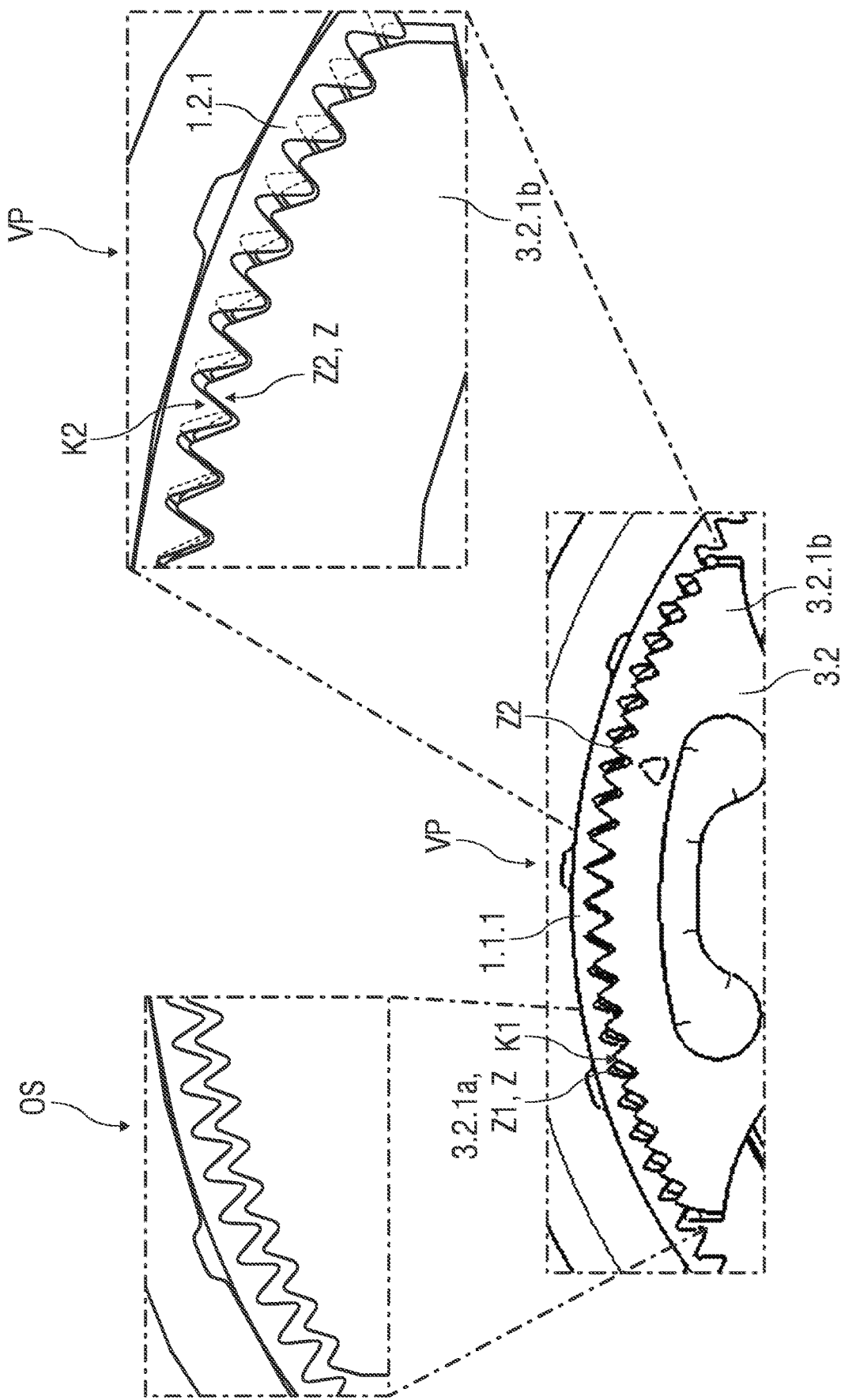

The adjustment fitting 1 furthermore comprises a control mechanism 4 which is configured such that the meshing of the gearing unit 2 and of the locking unit 3 takes place centrally in a locking position VP (illustrated in FIGS. 10, 11).

Here, the gearing unit 2 and the locking unit 3 are formed separately from one another and are coupled to one another in terms of movement.

By virtue of the fact that the gearing unit 2 and the locking unit 3 are formed separately from one another, their functions are separated from one another and can be configured in correspondingly optimized fashion. This makes it possible in a simple manner for the adjustment fitting 1 to be configured such that, when the control mechanism 4 is actuated, both in the case of a movement clockwise UR and in the case of a movement counterclockwise eUR, said adjustment fitting 1 moves an unlocking mechanism, in particular an unlocking unit 3.1, such that this releases the locking unit 3, and the adjustment fitting 1 can be adjusted. Unlocking of the locking unit 3 proceeding from a locking position VP, or locking of said locking unit 3 into the locking position VP, is thus possible by movement of the control mechanism 4, coupled in terms of movement to the unlocking unit 3.1, in both directions. Furthermore, the control mechanism 4 comprises a blocking contour which blocks the locking unit 3 in the locking position VP in the event of high mechanical loading, in particular in the event of an accident. For this purpose, the control mechanism 4 comprises a corresponding external contour 4.1, in particular a blocking contour, for example blocking cams or projections, which are illustrated in more detail in FIG. 1C.

Furthermore, the two play-eliminating elements 3.3 are configured to hold and to lock at least two of the locking elements 3.2 in the locking position VP in braced fashion. For this purpose, the respective play-eliminating element 3.3 comprises a corresponding bracing contour 3.3.1, which is illustrated in more detail in FIGS. 1C and 2C. The bracing contour 3.3.1 has a wedge shape, for example.

Furthermore, the holding action in a set locking position VP is effected by means of both the locking unit 3 and the gearing unit 2. Such multiple meshing or engagement of teeth and/or toothed rings in the locking position VP owing to the locking unit 3 that has engaged into the internal toothings 1.1.1, 1.2.1 and the gearing unit 2 that is rolling in the internal toothings 1.1.1, 1.2.1 allows an optimum load distribution in the locking position VP. This makes higher holding and locking unit loads possible.

In one possible embodiment, the gearing unit 2, designed for example as a planetary gearing, comprises at least one carrier 2.1, a locking element guide 2.2, toothed wheels 2.3, in particular planets, and associated bearing journals 2.4 and the control mechanism 4. The toothed wheels 2.3 may be equipped with lubricant reservoirs for lubrication.

In one possible embodiment, the locking unit 3 comprises at least one unlocking unit 3.1, a number of locking elements 3.2 and a number of play-eliminating elements 3.3, such as levers. A locking unit 3 is to be understood as meaning in particular a locking between at least one radially guided locking element 3.2 and a counterpart toothing.

Here, the first fitting part 1.1 and the second fitting part 1.2 each act as a ring gear of the locking unit 3. The first fitting part 1.1 and the second fitting part 1.2 furthermore each act as a ring gear of the gearing unit 2.

The first fitting part 1.1 has in particular a first internal toothing 1.1.1, which forms an internal toothing of the ring gear of a planetary gearing. The second fitting part 1.2 has a second internal toothing 1.2.1, which forms an internal toothing of the ring gear of a planetary gearing. The internal toothings 1.1.1 and 1.2.1 of the two fitting parts 1.1, 1.2 thus form the counterpart toothings for the gearing unit 2 and the locking unit 3.

In the exemplary embodiment, three toothed wheels 2.3 are shown, which act as planets of the planetary gearing. The three toothed wheels 2.3 are each rotatably mounted on one of the total of three illustrated bearing journals 2.4 and are in tooth meshing engagement both with the first internal toothing 1.1.1 and with the second internal toothing 1.2.1.

The bearing journals 2.4 are fastened to the carrier 2.1. Here, the bearing journals 2.4 are for example arranged so as to be distributed by 120° with respect to one another about the central axis A, the axis of rotation. The fitting parts 1.1, 1.2 designed as ring gears, and the carrier 2.1 with the bearing journals 2.4, and also the toothed wheels 2.3 acting as planets, form the gearing unit 2, which is designed as the planetary gearing.

The first fitting part 1.1 is fixedly connectable to the seat substructure SU of the vehicle seat S. Drive is output from the gearing unit 2, the ring gear of which is fixedly connected to the seat substructure SU, via an external toothing 1.2.2 of the second fitting part 1.2.

The second fitting part 1.2 is fixedly connectable to the backrest R.

The internal toothings 1.1.1 and 1.2.1 of the two fitting parts 1.1, 1.2 furthermore form the counterpart toothings for the locking unit 3.

The locking element guide 2.2 serves as a guide component of the locking unit 3. For this purpose, the locking element guide 2.2 comprises radial guides 2.2.1. The locking elements 3.2 have guide pins 3.2.3, which are illustrated in FIG. 2C. Here, three radial guides 2.2.1 are provided for the guide pins 3.2.3 of the three locking elements 3.2.

By means of the guide pins 3.2.3 (illustrated in FIGS. 2, 2C), the locking elements 3.2 are each guided in a radial direction in relation to the axis A in the radial guides 2.2.1, for example slots, grooves or channels. The locking elements 3.2 furthermore each have a cam 3.2.2 (illustrated in FIG. 1, 1C) for eliminating play.

The locking elements 3.2 each have a toothing 3.2.1 radially on the outside. The toothing 3.2.1 is formed in a manifold, in particular twofold, configuration in an axial direction. Here, in the locking position VP, each toothed ring row of the locking elements 3.2 can be brought into tooth meshing engagement in each case with one of the internal toothings 1.1.1 and 1.2.1 of the fitting parts 1.1, 1.2, such that the first fitting part 1.1 and the second fitting part 1.2 are locked to one another such that no relative rotation about the axis A is possible.

The two internal toothings 1.1.1 and 1.2.1 may be of different fineness. The first internal toothing 1.1.1 may have 114 teeth, for example. The second internal toothing 1.2.1 has 120 teeth, for example.

The locking unit 3 is for example in the form of an arrangement with 3 locking elements, wherein three locking elements 3.2 are locked centrally in the first and second fitting parts 1.1, 1.2 by means of the control mechanism 4. In particular, the control mechanism 4 is configured and coupled in terms of movement to the play-eliminating elements 3.3, in particular levers, such that two of the three locking elements 3.2 engage in braced fashion into the locking position VP. For this purpose, two of the locking elements 3.2 are held so as to be braceable in opposite directions with respect to one another by means of a positioning spring 5 or a bracing element 13. The positioning spring 5 is formed for example as an integral part of a carrier disk 6 for the locking unit 3. For this purpose, the carrier disk 6 comprises, for example, the bracing element 13 with spring arms 13.1. In an alternative embodiment (not illustrated), the positioning spring may be formed separately and held movably on the carrier disk 6 by means of bolts.

The control mechanism 4 is designed such that, in the case of a movement out of the locking position VP both clockwise UR and counterclockwise eUR, said control mechanism 4 moves the locking elements 3.2 out of the locking position VP and thus the adjustment fitting 1 opens.

Here, the locking elements 3.2 are for example arranged so as to be distributed by 120° with respect to one another about the central axis A, the axis of rotation. The locking elements 3.2 are in this case arranged so as to be offset by 60° with respect to the toothed wheels 2.3. Thus, the locking elements 3.2 and the toothed wheels 2.3 are arranged alternately and so as to be distributed about the central axis A by 60° with respect to one another.

By contrast to commonly series-connected raster-type gearing solutions with rasters for quick adjustment, it is the case in the adjustment fitting 1 that, when the locking unit 3 is opened, the backrest R is not free but remains connected to the seat substructure SU via the gearing unit 2.

The adjustment fitting 1 is driven directly, as shown by way of example in FIG. 1A. For example, such direct drive takes place via a transmission tube 14 by means of which a drive torque is transmitted from a motor 5 to the control mechanism 4. The configuration of the adjustment fitting 1, in particular of the locking unit 3, also with an opening movement in both directions of rotation (=eUR, UR), without the need for a separate component as an actuator to retract the locking elements 3.2 (also referred to as toothed segments) in always one direction of rotation, makes it possible for the adjustment in a desired direction of rotation of the backrest R to be able to be motor-driven.

The play-eliminating elements 3.3 are of lever-like form. The play-eliminating elements 3.3 furthermore each have a bracing contour 3.3.1 for the purposes of eliminating play. The bracing contour 3.3.1 may be designed as an external or internal contour. The bracing contour 3.3.1 has a wedge shape. The locking elements 3.2 each have a corresponding cam 3.2.2 which enters into operative engagement with the associated bracing contour 3.3.1 so as to allow an elimination of play.

Here, during a desired adjustment of the backrest R, the rotational movement of the drive in one of the two directions firstly in particular causes two of the play-eliminating elements 3.3 with the bracing contour 3.3.1 to be pulled together and preloaded by means of the positioning spring 5, wherein the locking elements 3.2 are unlocked, wherein, with a similar further rotational movement in the same direction of rotation, the toothed wheels 2.3, in particular the planets, are subsequently driven, and the backrest R is moved, in particular adjusted.

Through special geometrical design of the teeth of the locking elements 3.2 and the (mirrored) position of the locking elements 3.2 with respect to one another, the toothings 3.2.1 of the locking elements 3.2 are used in the adjustment fitting 1 to completely eliminate play of the adjustment fitting 1. Here, manufacturing tolerances are compensated for by bracing contours 3.3.1 on the spring-preloaded play-eliminating elements 3.3, for example the levers, mounted in the planet carrier by way of engagement of the toothings 3.2.1 to different depths in combination with the movement of said toothings 3.2.1 in the circumferential direction correspondingly to the position of the toothed rings of the internal toothings 1.1.1 and 1.2.1 of the fitting parts 1.1, 1.2, without the need for the toothed ring fixed to the backrest of the internal toothing 1.2.1 of the fitting part 1.2 fixed to the backrest to move relative to the toothed ring fixed to the seat of the internal toothing 1.1.1 of the fitting part 1.1 fixed to the seat, that is to say the adjustment is continuously variable.

Furthermore, the locking element guide 2.2 may be spring-preloaded for the purposes of positioning the locking elements 3.2 with respect to one another and for the purposes of guiding the locking elements 3.2 out of the locking position VP into a central initial or open position OS (also referred to as reset, illustrated in FIG. 11). By means of such a locking element movement in the circumferential direction, which is made possible during the engagement of the locking elements 3.2 into the locking position VP, combined with a tangential force component of the play-eliminating elements 3.3 and of the control mechanism 4, a possible tip-to-tip position of internal toothings 1.1.1, 1.2.1 and toothings 3.2.1 of the locking elements 3.2 in the locking position VP is substantially avoided.

The carrier disk 6 is provided for holding the toothed wheels 2.3 and movably guiding the positioning spring 5 during the preloading of the play-eliminating elements 3.3. The two fitting parts 1.1, 1.2 are furthermore held together by means of a holder 7. Here, the second fitting part 1.2 is mounted movably in the holder 7. The first fitting part 1.1 is fixed to the holder 7, and these are in particular fastened to one another by a form fit, force fit and/or material bond, for example by welding.

Furthermore, two outer covers 8.1 and 8.2 are provided for protecting the adjustment fitting 1. The covers 8.1, 8.2 are for example of disk-shaped design with an angled edge. Furthermore, the covers 8.1 and 8.2 are fixedly connected to the holder 7 and/or to the fitting parts 1.1, 1.2. The covers 8.1 and 8.2 serve in particular for the paint sealing unit and for reducing noise. At least one washer 9, in particular corrugated washers or spring elements, and one bearing element 10 may be provided between the respective cover 8.1, 8.2 and the respective fitting part 1.1, 1.2 and/or the holder 7. The bearing element 10 is furthermore designed as a brake device 17, for example in the form of a corrugated disk.

For holding the locking element guide 2.2, in particular in centred fashion, the bearing element 10 may furthermore comprise a further positioning spring 5 in the form of integrated spring arms 5.1, by means of which the locking element guide 2.2 is spring-preloaded and held centered on the carrier 2.1.

Figure 2A:
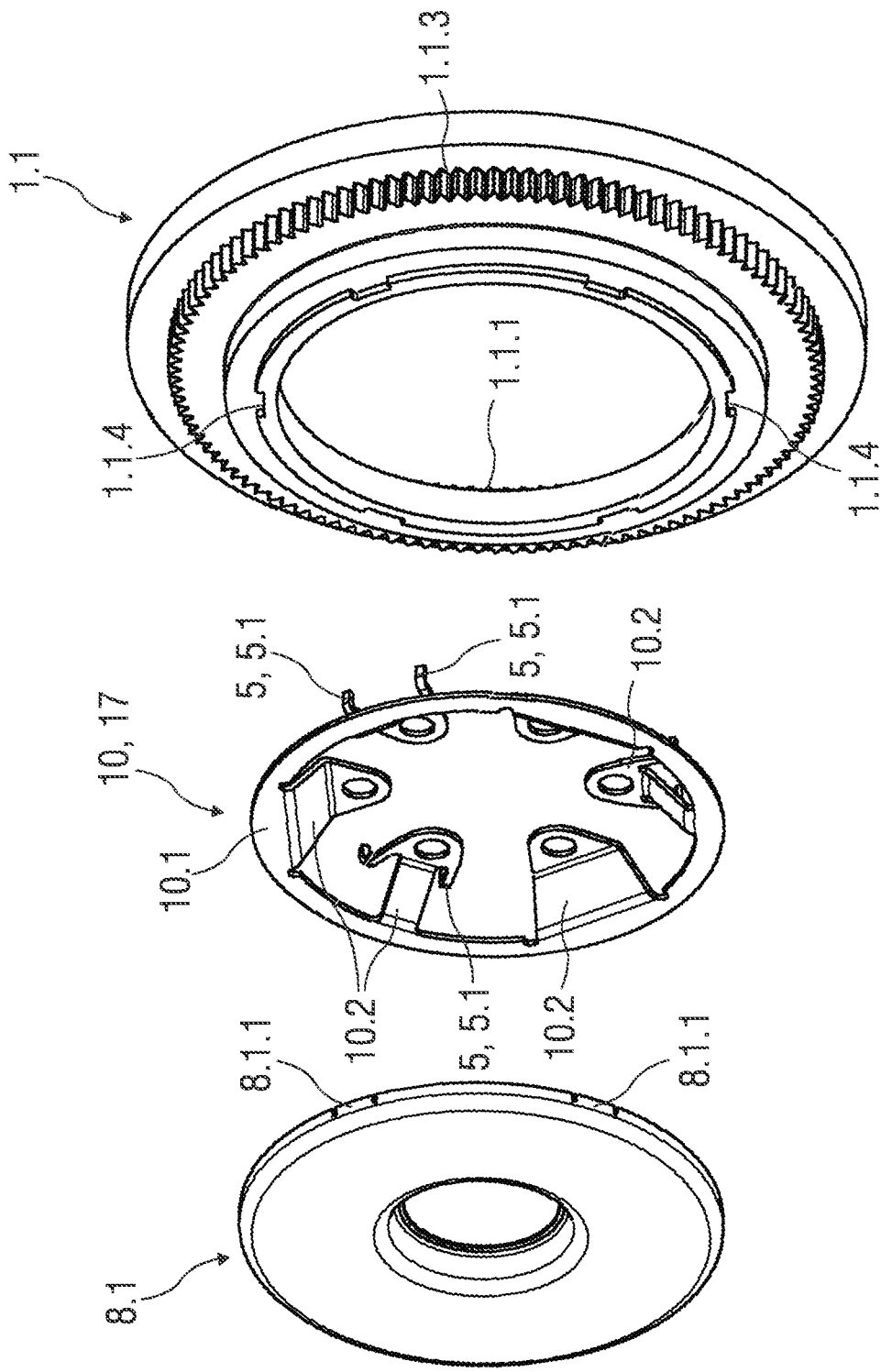

FIGS. 1A and 2A show the bearing element 10, the cover 8.1 and the first fitting part 1.1 (fixed to the seat) in detail. The bearing element 10 has a corrugated shape, in particular in order to realize a braking function. For this purpose, the bearing element 10 comprises, for example, brake arms 10.2 directed axially and radially inward from a ring 10.1. The ring 10.1 lies on a support 1.1.2 of the first fitting part 1.1. The support 1.1.2 comprises, for example, a number of support tongues or lugs which project, in particular in symmetrically distributed fashion, radially inward from a hollow ring shoulder of the first fitting part 1.1. These brake arms 10.2 are fixedly connected to the carrier 2.1 under preload, in particular by riveting. In this way, the carrier 2.1 is held under preload on the first fitting part 1.1 (fitting part fixed to the seat). Such a braking function is required to reliably achieve an overtravel during the retraction of the locking elements 3.2 in order that a backrest adjustment does not start before the locking elements 3.2 are at a sufficient distance from the counterpart toothings—the internal teeth 1.1.1, 1.2.1 of the fitting parts 1.1, 1.2. In the exemplary embodiment, six brake arms 10.2 are arranged in distributed fashion, and for example so as to be offset in each case by 60° with respect to one another, on the ring 10.1.

Furthermore, in detail, the bearing element 10 comprises, as a positioning spring 5, the integrated spring arms 5.1 for holding the locking element guide 2.2 in centred fashion. In the exemplary embodiment, three of the six brake arms 10.2 each comprise two protruding integrated spring arms 5.1.

Instead of a single-piece embodiment of bearing element 10 and positioning spring 5, these may also be formed separately, as illustrated. Here, the separate bearing element 10' may be designed as a corrugated washer, and the separate positioning spring 5' may be designed as a wire spring.

The cover 8.1 is connected to the first fitting part 1.1 in particular by a form fit and a force fit, for example by virtue of these being clamped together, engaged together with detent action, flanged together or crimped together. For example, the cover 8.1 comprises, distributed about the circumference at the edge, a number of fastening elements 8.1.1 which are formed in by means of slots and which, in the assembled state of the adjustment fitting 1, are connected to the adjustment fitting 1 by a form fit and a force fit in receptacles 1.1.4 of the first fitting part 1, for example by flanging or crimping.

The first fitting part 1.1 additionally comprises an external toothing 1.1.3 (see FIG. 2A).

Figure 2B:
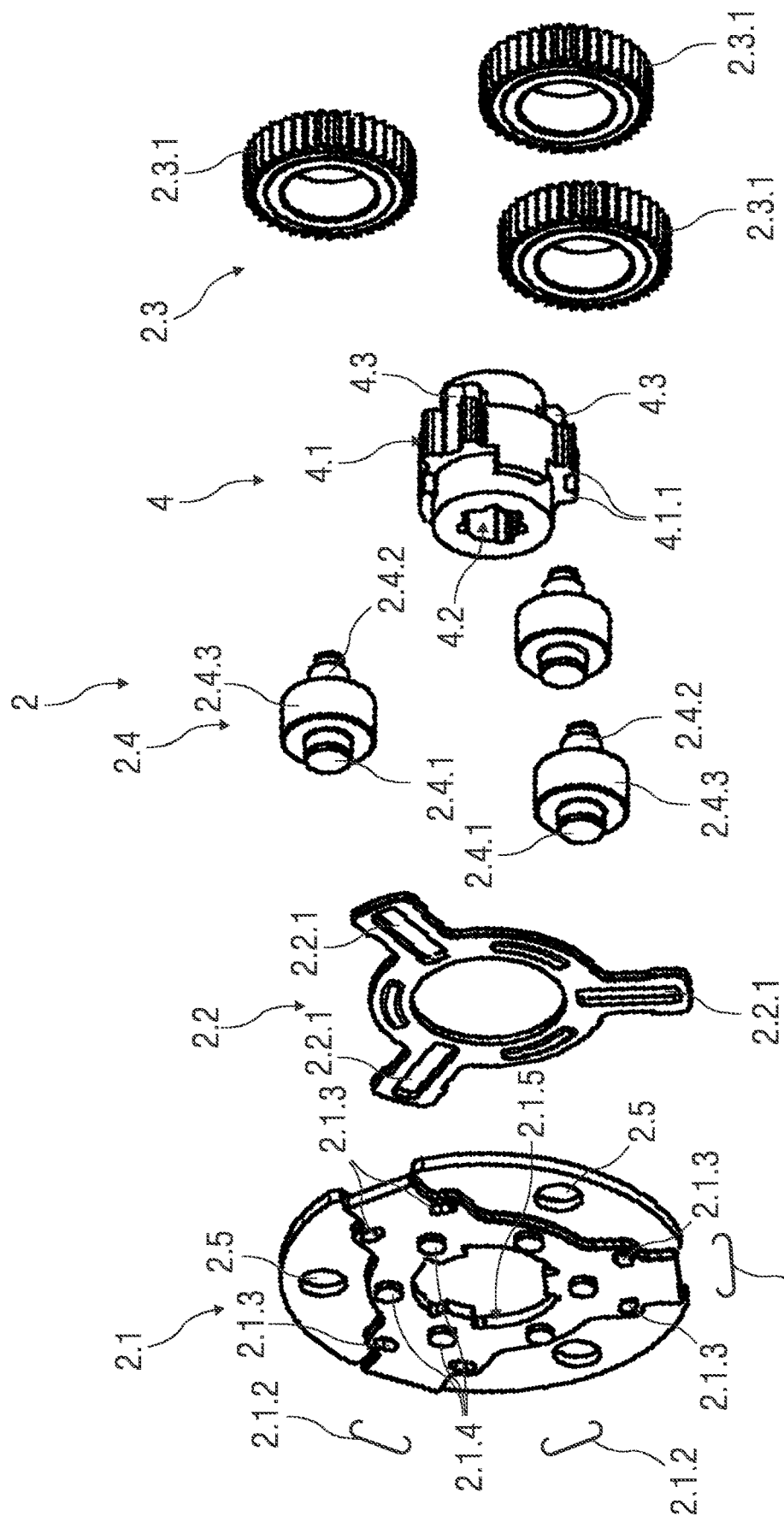
Figure 2C:
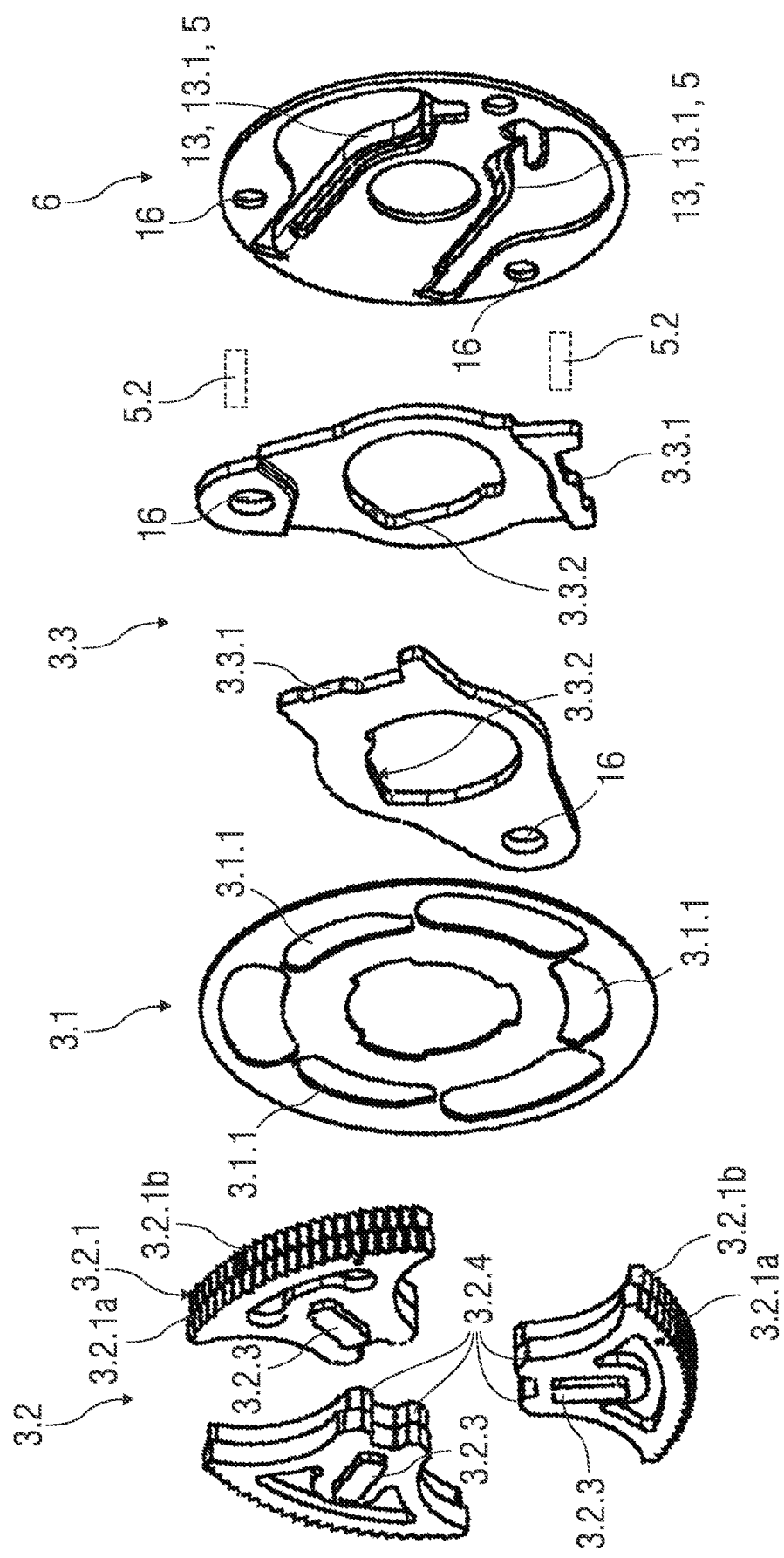

FIGS. 1B and 2B show the gearing unit 2 with its components—the carrier 2.1, the locking element guide 2.2, the toothed wheels 2.3, the bearing journals 2.4 thereof and the control mechanism 4—in detail. The carrier unit 2.1 comprises receptacles 2.5 for the bearing journals 2.4.

To hold the locking element guide 2.2 on the carrier 2.1, the latter has a corresponding internal contour 2.1.1, in which the locking element guide 2.2 is arranged. Here, the internal contour 2.1.1 has dimensions slightly larger than those of the external contour of the locking element guide 2.2 in order to compensate for tolerances. In order for the locking element guide 2.2 to be held securely on the carrier 2.1, said locking element guide 2.2 is held on the carrier 2.1 by means of fastening elements 2.1.2, for example spring clips. Here, the fastening elements 2.1.2 extend, from the carrier side facing away from the locking element guide 2.2, through passage openings 2.1.3 in the carrier 2.1, and with their free ends hold the locking element guide 2.2 in the internal contour 2.1.1 on the carrier 2.1.

The radial guides 2.2.1 of the locking element guide 2.2 are in the form of elongated holes. The locking element guide 2.2 is for example of disk-shaped form as an inner ring with radially protruding arms, into which slots or elongated holes are formed as radial guides 2.2.1 for the cams 3.2.2.

The bearing journals 2.4 are each cylindrical with two axial bearing ends 2.4.1, 2.4.2 and a bearing body 2.4.3 for the toothed wheels 2.3. The respective first axial bearing end 2.4.1 is mounted in the receptacle 2.5 of the carrier 2.1. The respective second axial bearing end 2.4.2 is mounted in the carrier disk 6. Furthermore, at least two of the second axial bearing ends 2.4.2 are received in the openings 16 of the play-eliminating elements 3.3 and serve as bearings for the play-eliminating elements 3.3. Alternatively, a separate bolt 5.2 may be provided.

To fasten the brake arms 10.2 of the bearing element 10 under preload to the carrier 2.1, the latter comprises, for example, corresponding fastening means 2.1.4, for example protruding rivet bolts, which are riveted to openings in the brake arms 10.2 (illustrated in FIG. 2B).

Furthermore, the disk-shaped carrier 2.1 has an inner ring contour 2.1.5 which corresponds to an external contour 4.1 of the control mechanism 4 (illustrated in FIG. 2B).

The control mechanism 4 furthermore comprises an internal contour 4.2, which corresponds to a contour of the transmission tube 14 of the motor 15.

The toothed wheels 2.3 each have an external toothing 2.3.1, which external toothings correspond to the internal toothings 1.1.1 and 1.2.1 of the fitting parts 1.1, 1.2.

FIGS. 1C and 2C show the locking unit 3 and its components—the locking elements 3.2, the unlocking unit 3.1, the play-eliminating elements 3.3 and the carrier disk 6—in detail.

The locking elements 3.2 each have a toothing 3.2.1 radially on the outside. The toothing 3.2.1 is formed in a manifold, in particular twofold, configuration in an axial direction. For example, each locking element 3.2 comprises two radial toothed rings 3.2.1a and 3.2.1b, which are arranged axially adjacent to one another in one plane. Here, the toothed ring row of the respective radial toothed ring 3.2.1a, 3.2.1b can, in the locking position VP, be brought into tooth meshing engagement by way of at least one of the teeth with one of the internal toothings 1.1.1 and 1.2.1 of the fitting parts 1.1, 1.2.

The locking elements 3.2 each have the cam 3.2.2, which enters into operative engagement with the associated bracing contour 3.3.1 of the play-eliminating elements 3.3 in order to make possible an elimination of play.

Furthermore, the locking elements 3.2 have the guide pins 3.2.3 on the surface side facing away from the cams 3.2.2 in the direction of the gearing unit 2.

In the direction of the control mechanism 4, the locking elements 3.2 have protruding webs 3.2.4 which, in the locking position VP of the adjustment fitting 1, move into a tip-to-tip position with the external contour 4.1 of the control mechanism 4 in order to keep the locking elements 3.2 in their locking meshing engagement and in particular to block said locking elements 3.2 there when high mechanical loads occur (=so-called crash locking function).

The play-eliminating elements 3.3 are of lever-like form. As already described above, the play-eliminating elements 3.3 each have the bracing contour 3.3.1.

In order to configure the adjustment fitting 1 and its locking unit 3 with an opening movement in both directions of rotation (=eUR, UR) by retraction of the locking elements 3.2, the respective play-eliminating element 3.3 furthermore has a corresponding opening contour 3.3.2, in particular an internal contour. The opening contours 3.3.2 of the two play-eliminating elements 3.3 are of oppositely directed configuration. The play-eliminating elements 3.3 are actuated in opposite directions. The control mechanism 4 comprises at least one guide pin 4.3 (illustrated in FIGS. 1B and 4, 5, 8), which is moved along the opening contour 3.3.2.

The locking elements 3.2 are held in preloaded fashion on the carrier disk 6. For this purpose, two of the locking elements 3.2 are held so as to be braceable in opposite directions with respect to one another by means of the two integrated spring arms 13.1. Furthermore, the carrier disk 6 and the play-eliminating elements 3.3 comprise corresponding openings 16 in which the bearing ends 2.4.2 or optionally associated bolts 5.2 for the mounting of the play-eliminating elements 3.3 on the carrier disk 6 are received (as illustrated in FIGS. 1B, 2B, 1C and 2C).

For the retraction of the locking elements 3.2 by means of the cams 3.2.2, the unlocking unit 3.1 comprises a sliding guide in the form of slots 3.1.1, in particular arcuate ring slots.

Figure 2D:
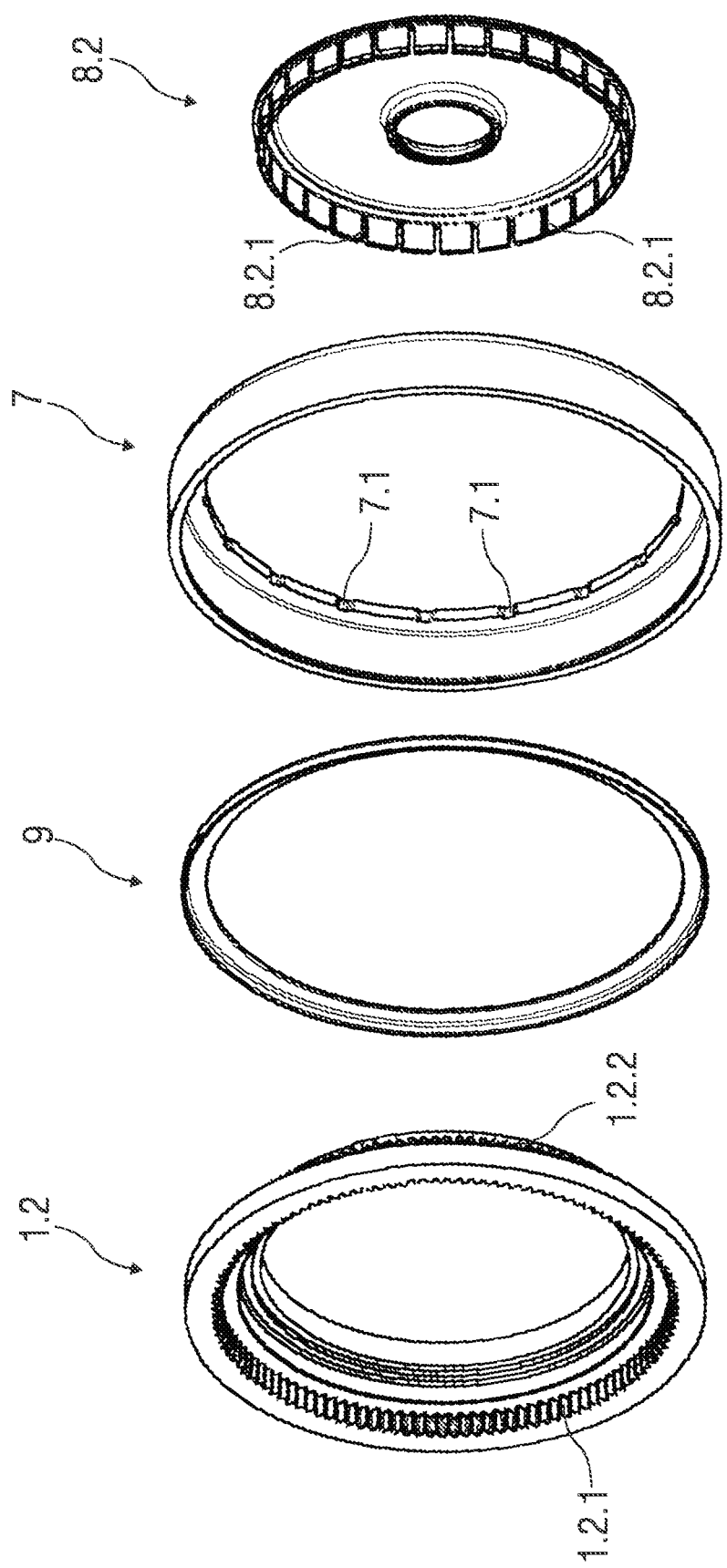

FIGS. 1D and 2D show the backrest-side components of the adjustment fitting 1, in particular the second (backrest-side) fitting part 1.2, the washer 9, the holder 7 and the cover 8.2, in detail. The cover 8.2 is attached to the holder 7 by a form fit and a force fit, in particular by flanging, crimping or detent engagement. The holder 7 is of hollow cylindrical form, in particular as an annular disk, which has at least one inwardly directed edge. A number of symmetrically distributed recesses 7.1 are provided in the edge. The cover 8.2 furthermore has, for example, a number of fastening elements 8.2.1, which are each connected, for example by flanging or crimping, to that edge of the holder 7 which is directed toward.

Figure 3A:
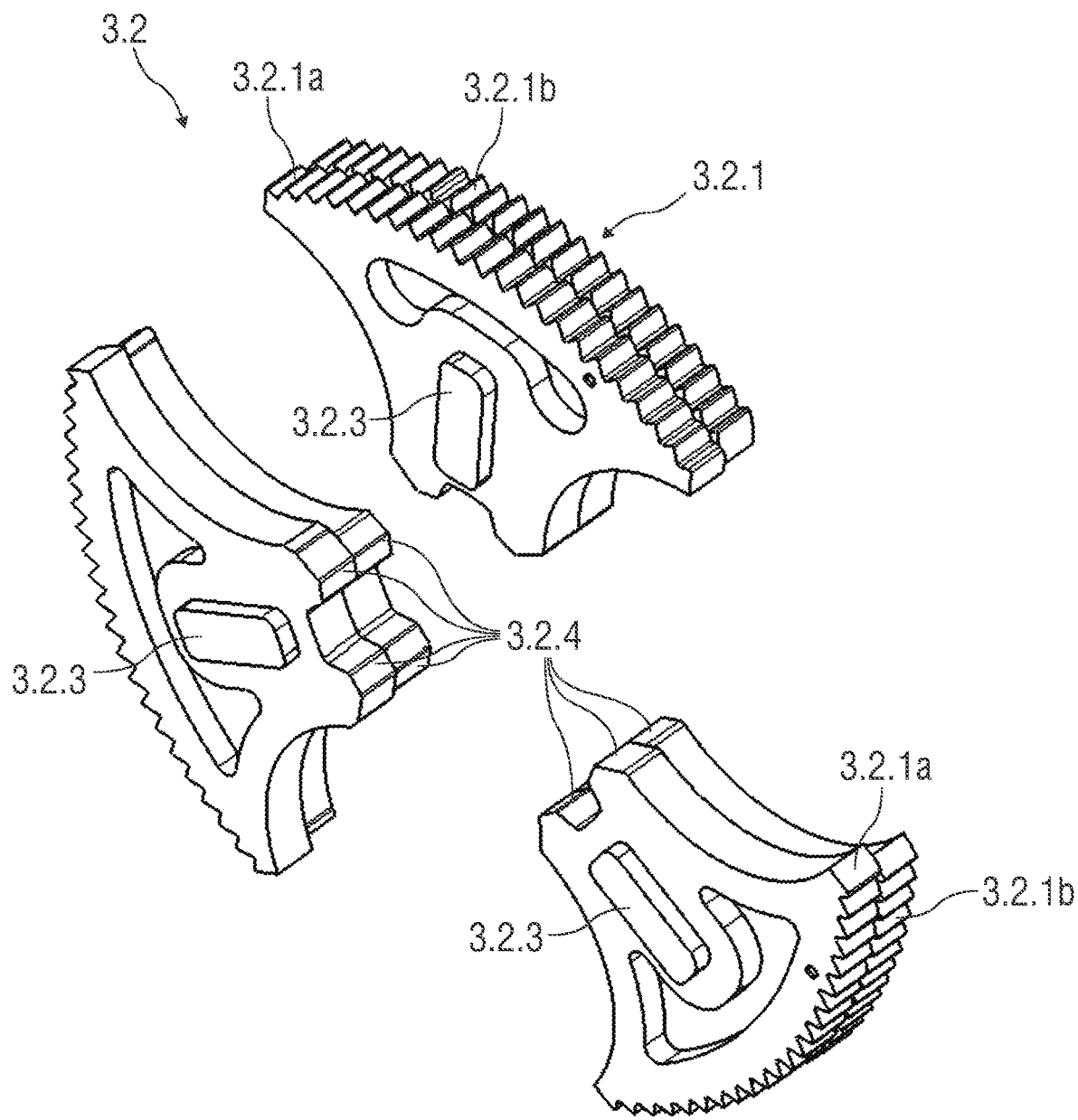
Figure 3B:
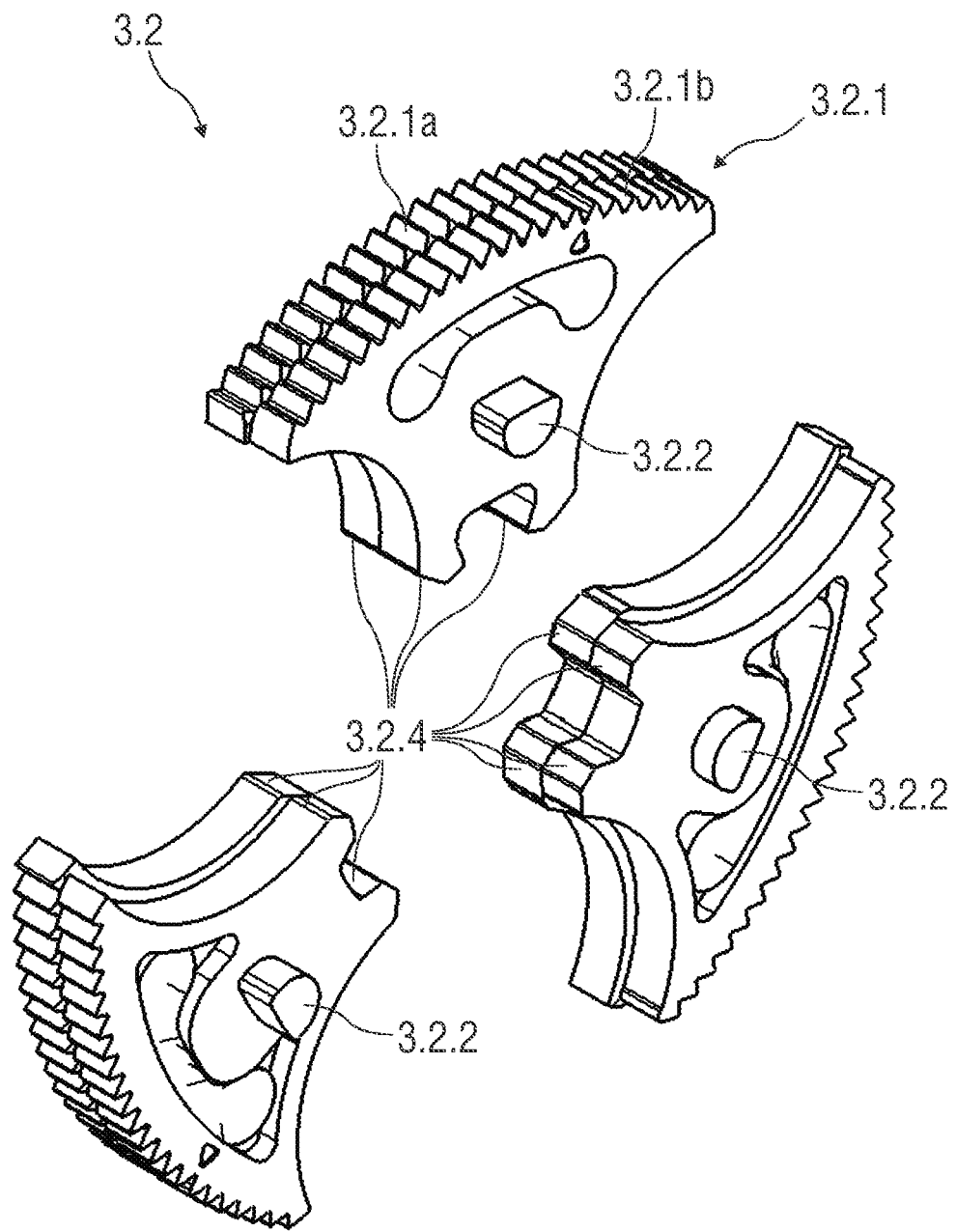

FIGS. 3A and 3B schematically show different views of the three locking elements 3.2 of the locking unit 3 with the radial toothed rings 3.2.1a, 3.2.1b. The radial toothed rings 3.2.1a and 3.2.1b may have an equal number of teeth or different numbers of teeth. In the exemplary embodiment, the numbers of teeth differ. The shapes of the radial toothed rings 3.2.1a and 3.2.1b may likewise differ. The shape of the locking elements 3.2 may likewise differ. The locking elements 3.2 with the two radial toothed rings 3.2.1a and 3.2.1b may each be of single-part form, for example composed of a sintered material, or formed as an injection-molded component. Alternatively, they may be formed separately and fixedly connected to one another, in particular by welding.

Furthermore, all the tooth tips of the radial toothed rings 3.2.1a and 3.2.1b of the respective locking element 3.2 may be configured so as to have the same tip spacings as the ring gear toothing, in particular the internal toothings 1.1.1, 1.2.1 of the fitting parts 1.1, 1.2. Alternatively, the tips of the teeth of the respective radial toothed ring 3.2.1a and 3.2.1b may be differently spaced apart from one another. For example, the tip spacings between the teeth of the respective radial toothed ring 3.2.1a and 3.2.1b may decrease outwardly as viewed from a centerline of the respective locking element 3.2.

Figure 4:
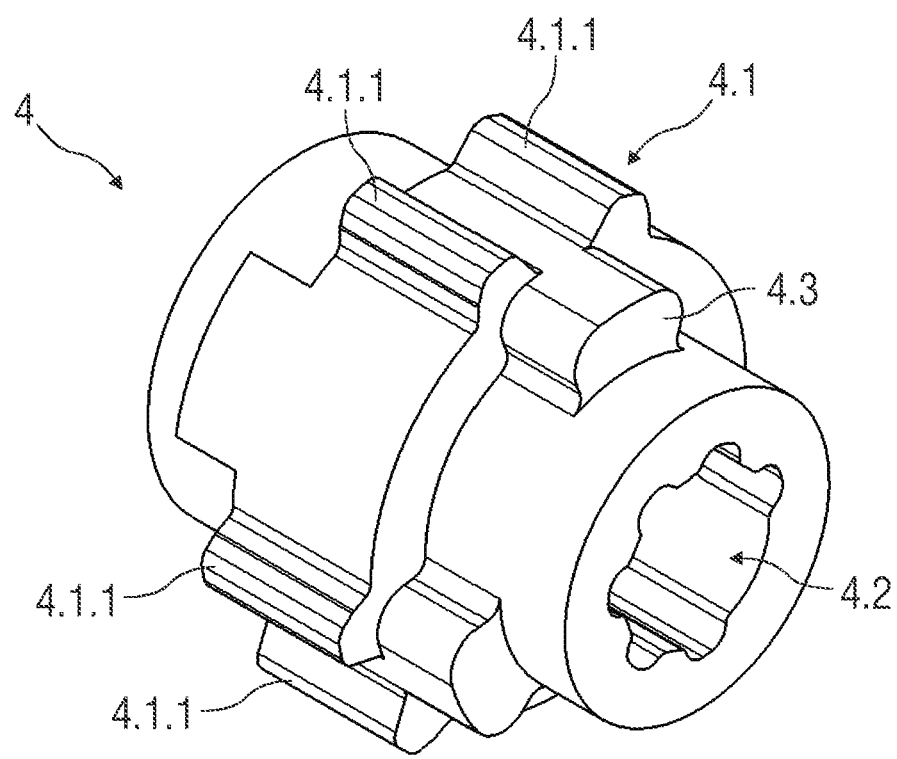

FIG. 4 schematically shows the control mechanism 4 in detail with its external contour 4.1, the internal contour 4.2 and the guide pin 4.3. The external contour 4.1 comprises projections 4.1.1, which in the locking position VP hold, in particular block, the locking elements 3.2 in their locked position.

Figure 5:
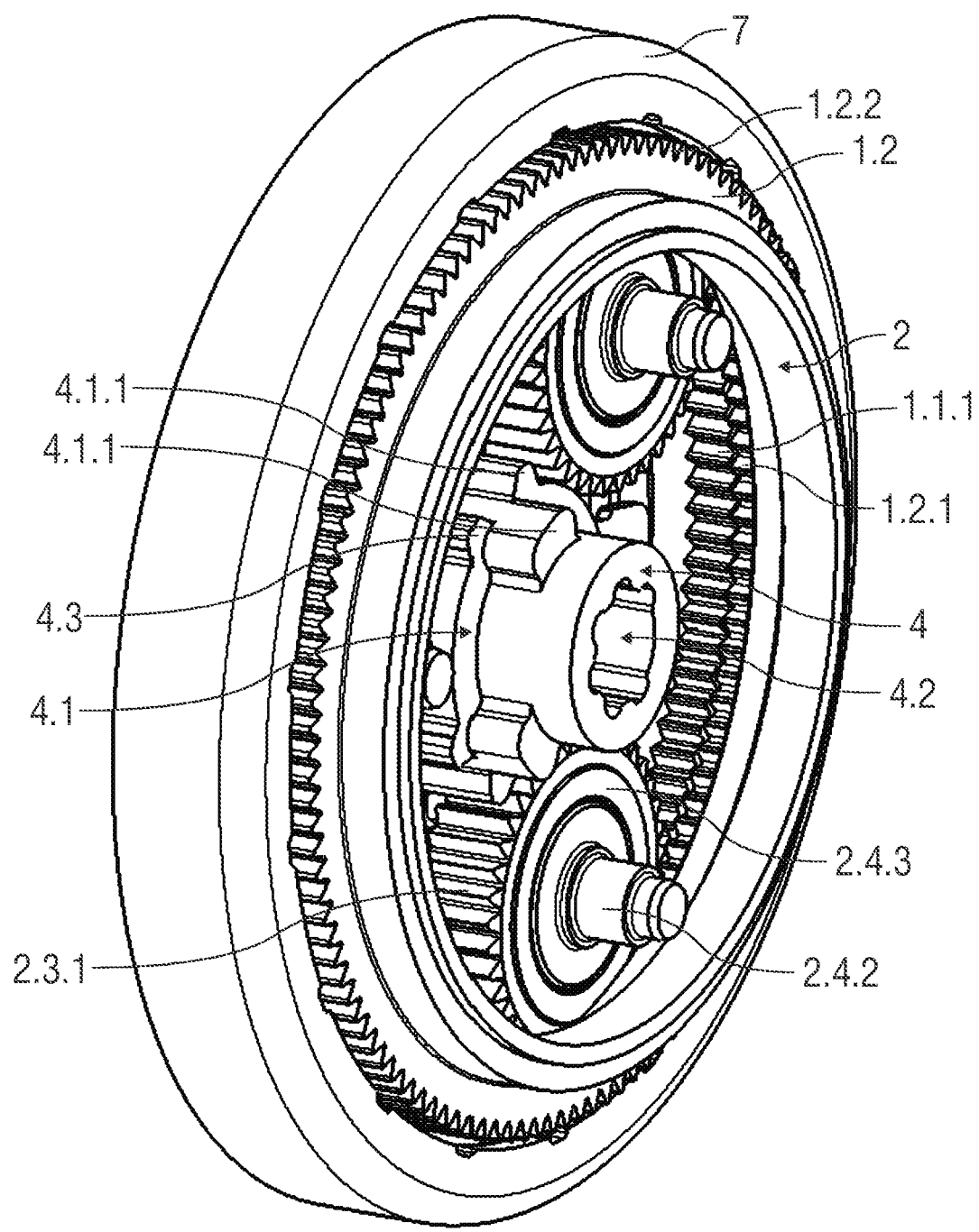

FIG. 5 schematically shows the gearing unit 2 in the assembled state in the two fitting parts 1.1, 1.2 of the adjustment fitting 1 and without the locking unit 3. Here, the toothed wheels 2.3 mesh with the two internal toothings 1.1.1 and 1.2.1.

Figure 6:
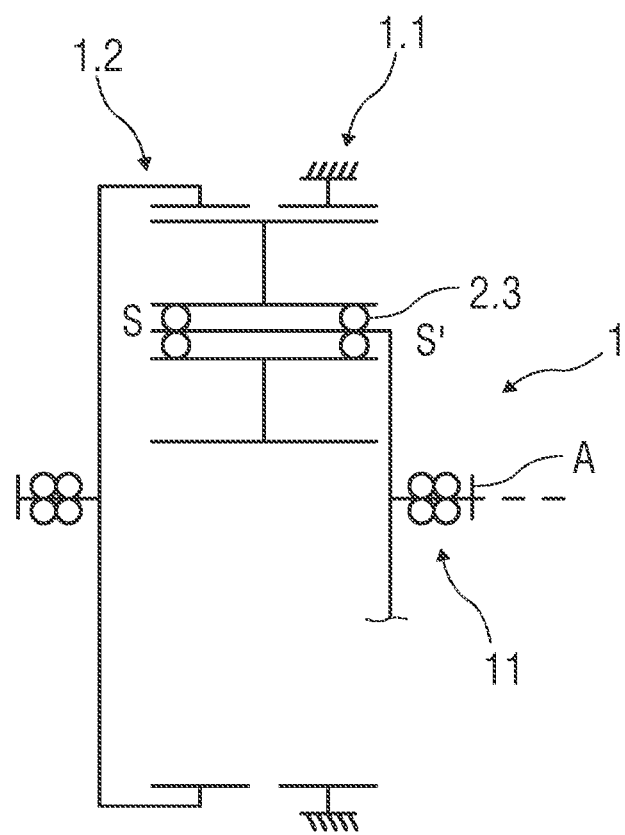

FIG. 6 schematically shows an embodiment of a gearing setup of an adjustment fitting 1 with a central drive 11 for the motor 15.

Figure 7:
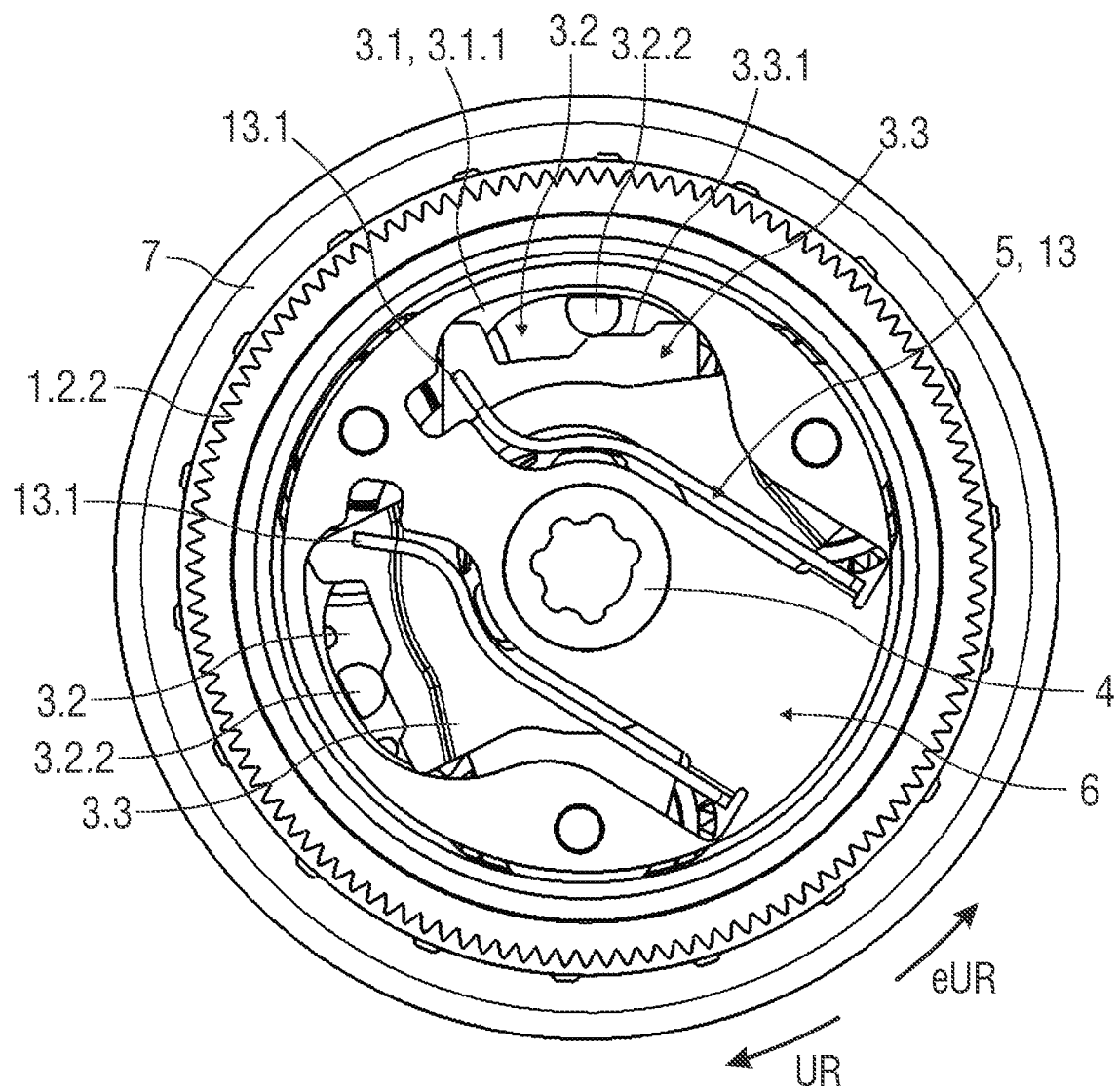

FIG. 7 schematically shows the backrest side of the adjustment fitting 1 without cover 8.2 and with carrier disk 6 and with the second fitting part 1.2 with external toothing 1.2.2. The carrier disk 6 comprises a further positioning spring 5 with integrated spring arms 13.1 for the play-eliminating elements 3.3 with their bracing contour 3.3.1 for the cams 3.2.2 of the locking elements 3.2. For the retraction of the locking elements 3.2 by means of the cams 3.2.2, the unlocking unit 3.1 comprises a sliding guide in the form of the slots 3.1.1, in particular arcuate ring slots.

In this FIG. 7, the spring arms 13.1 have not yet hooked in behind the play-eliminating elements 3.3, in particular levers, and have therefore not yet been braced.

The adjustment fitting 1 is driven directly. For example, such direct drive takes place via a transmission tube (not illustrated in any more detail) by means of which a drive torque is transmitted from a motor to the control mechanism 4. In order to configure the adjustment fitting 1 and its locking unit 3 with an opening movement in both directions of rotation (=eUR, UR) by retraction of the locking elements 3.2, the respective play-eliminating element 3.3 has a corresponding opening contour 3.3.2, in particular an internal contour. The opening contours 3.3.2 of the two play-eliminating elements 3.3 are of oppositely directed configuration. The play-eliminating elements 3.3 are actuated in opposite directions. The control mechanism 4 comprises at least one, in particular multiple, guide pin(s) 4.3, which is/are moved along the opening contour 3.3.2.

Figure 8:
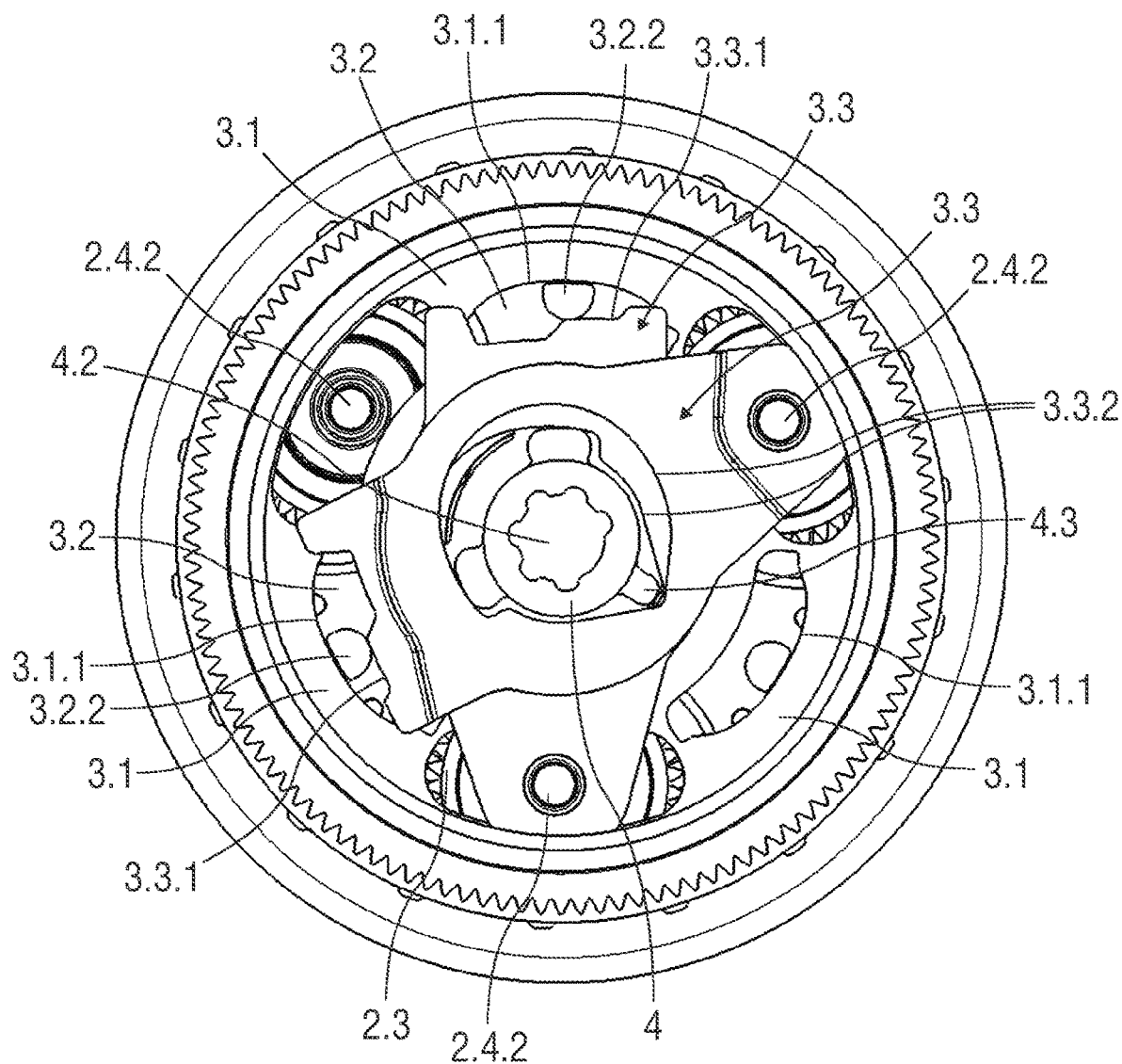

FIG. 8 schematically shows a further view of the backrest side of the adjustment fitting 1 according to FIG. 7 without cover 8.2, without carrier disk 6 with spring arms 13.1 for the play-eliminating elements 3.3 and with unlocking unit 3.1. Only two of the locking elements 3.2 have been guided in preloaded fashion by means of the play-eliminating elements 3.3 and in particular the bracing contour 3.3.1 thereof and locked in preloaded fashion in the locking position VP.

Figure 9:
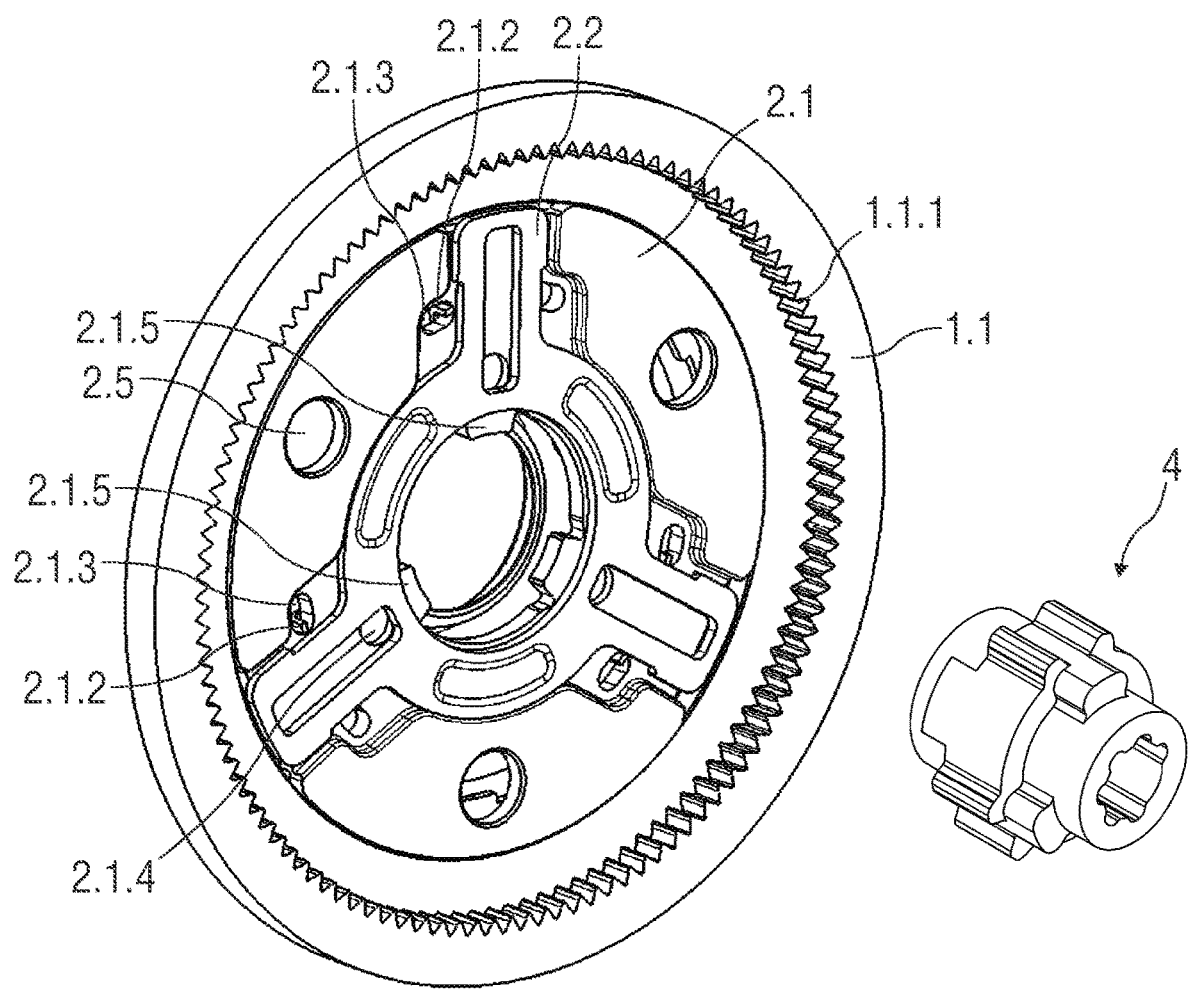

FIG. 9 schematically shows, in a view from the inside of a side fixed to the seat, the adjustment fitting 1 with the first fitting part 1.1 and the internal toothing 1.1.1 thereof, with the locking element guide 2.2, with the carrier 2.1 for the locking element guide 2.2 and with the fastening elements 2.1.2 for the tolerance-compensating mounting of the locking element guide 2.2 in the carrier 2.1, and without the central control mechanism 4. The carrier 2.1 comprises an inwardly directed internal ring contour 2.1.5 with carrier lugs, which are arranged with an idle travel in the external contour 4.1 of the control mechanism 4 in the assembled state of the adjustment fitting 1.

FIG. 10 schematically shows a plan view of an embodiment of the combined gearing unit 2 and the locking unit 3 of the adjustment fitting 1 in the locking position VP, in which both the locking elements 3.2 and the toothed wheels 2.3 are in tooth meshing engagement with the internal toothings 1.1.1, 1.2.1 of the fitting parts 1.1, 1.2. The locking elements 3.2, also referred to as toothed segments, may have different shapes, in particular contours, for laser-welded connections, for example in order to weld the two disk-shaped segments together in the case of a multi-part design of the locking elements 3.2. Here, the connection of the segments is performed particularly close to the toothing 3.2.1 and over the greatest possible length, and without a high load at the start of the seam. For this reason, a rounded welding contour is illustrated in the exemplary embodiment. As already described above, the respective locking element 3.2 may also be of single-part form. The segments of the locking elements 3.2 may also all be welded uniformly.

FIG. 11 shows the detail view of the meshing of one of the locking elements 3.2 in the counterpart toothings of the fitting parts 1.1, 1.2 in the locking position VP of the adjustment fitting 1. In each toothing plane, that is to say in a first toothing plane with the first internal toothing 1.1.1 of the first fitting part 1.1 and in a second toothing plane with the second internal toothing 1.2.1 of the second fitting part 1.2, in each case only one tooth is in contact with the associated internal toothing 1.1.1 or 1.2.1 for the purposes of the play-eliminating function.

Thus, the radial toothed ring 3.2.1a that meshes with the first internal toothing 1.1.1 comprises a first tooth Z1 which, in the locking position VP, comes into direct contact with the first internal toothing 1.1.1 in the contact region K1. The other teeth of the radial toothed ring 3.2.1a mesh with the first internal toothing 1.1.1 without making contact, and thus with play.

The radial toothed ring 3.2.1b that meshes within the second internal toothing 1.2.1 comprises a second tooth Z2 which, in the locking position VP, comes into direct contact in the contact region K2 with the second internal toothing 1.2.1. The other teeth of the radial toothed ring 3.2.1b mesh with the second internal toothing 1.2.1 without making contact, and thus with play.

Figure 12:
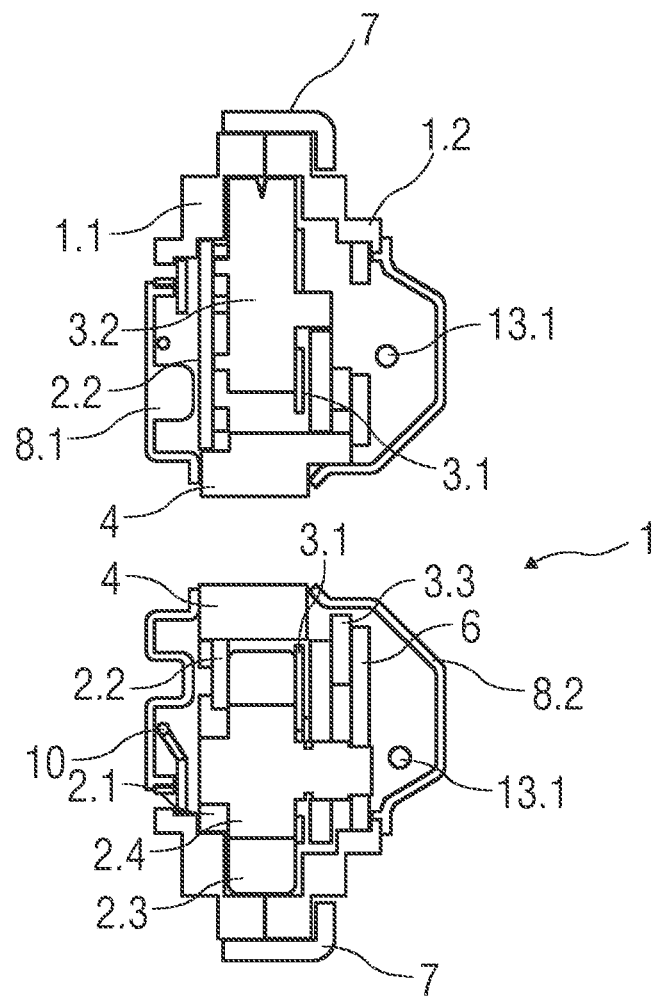

FIG. 12 schematically shows a sectional illustration of the adjustment fitting 1.

FIG. 13 schematically shows the assembled adjustment fitting 1 on flanges 12 in a perspective illustration from the inside of the vehicle seat S. The upper flange 12.1 is fastened to the backrest R. The lower flange 12.2 is fastened, at the vehicle side, to the seat substructure SU.

Such a vehicle seat S with such an adjustment fitting 1, as described above, can dissipate high loads from the backrest R via the adjustment fitting 1 and the flanges 12 into the seat substructure SU. The vehicle seat S may have an integrated belt system.

Figure 14A:
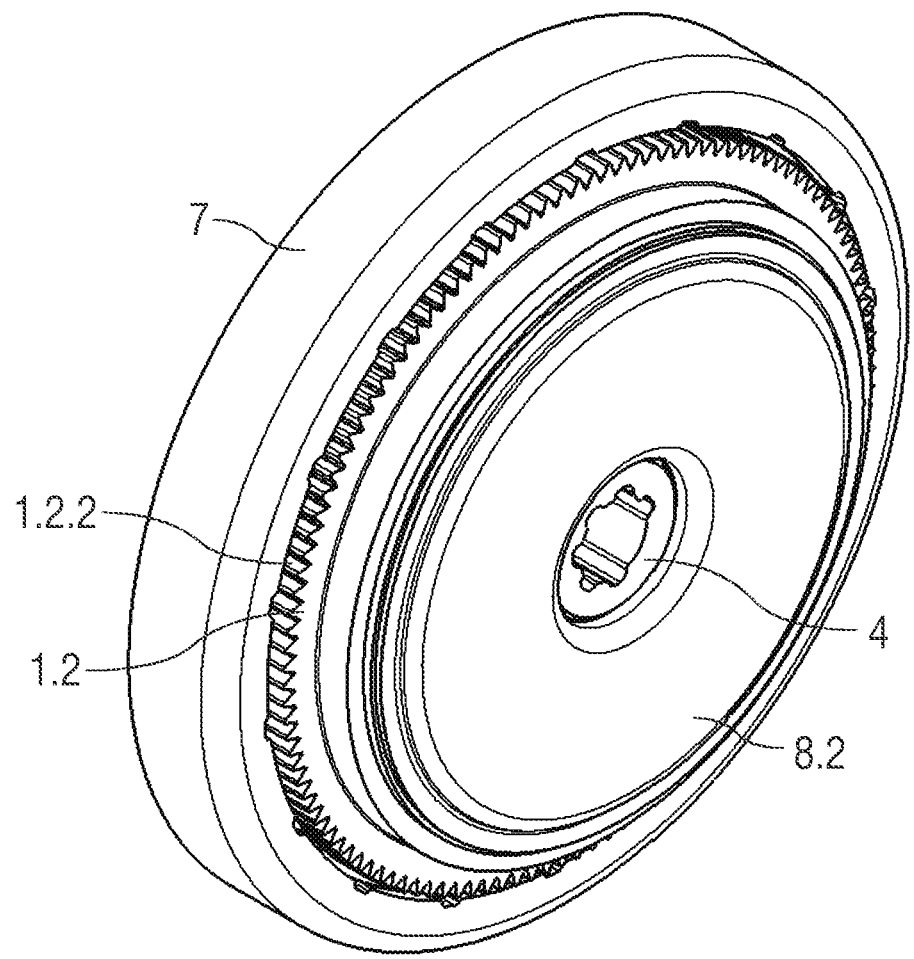
Figure 14B:
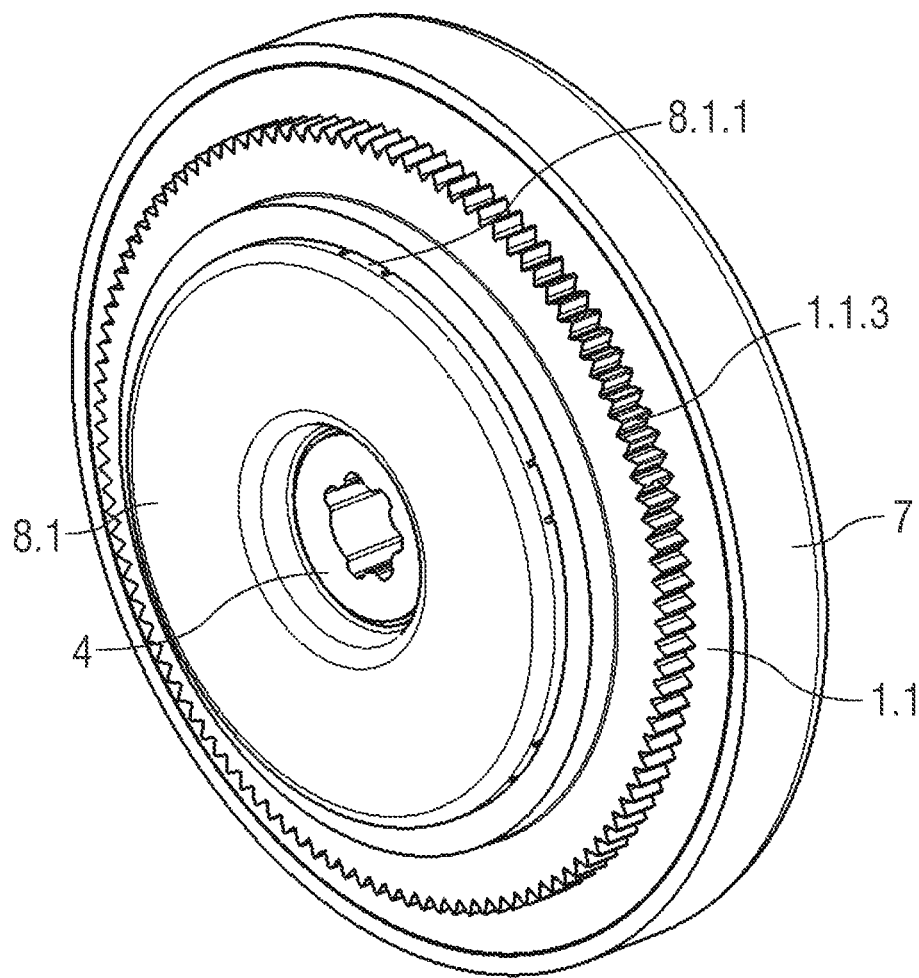

FIGS. 14A and 14b schematically show the covered adjustment fitting 1 in the assembled state.

Figure 15:
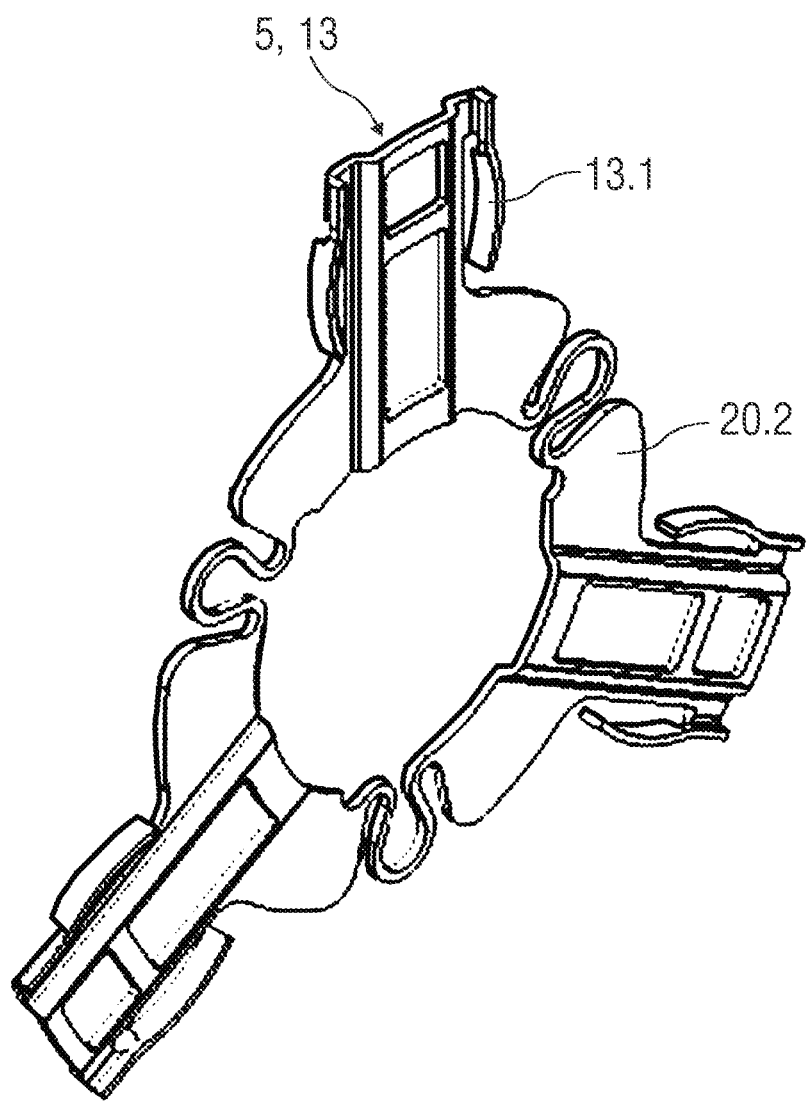

FIG. 15 schematically shows an exploded illustration of an alternative embodiment of a locking element guide 20.2 of an adjustment fitting 1.

Furthermore, a spring-preloaded locking element guide 20.2 (also referred to as segment guide) may be provided for the purposes of positioning the locking elements 3.2 with respect to one another and for the purposes of guiding the locking elements 3.2 out of the locking position VP into the central initial or open position OS (also referred to as reset, illustrated in FIG. 11). The locking element guide 20.2 enables the locking elements 3.2 to move in the circumferential direction. By means of such a locking element movement in the circumferential direction, which is made possible during the engagement of the toothings 3.2.1 of the locking elements 3.2 into the locking position VP, combined with a tangential force component of the play-eliminating elements 3.3 and of the control mechanism 4, a possible tip-to-tip position of the teeth is substantially avoided.

Figure 16:
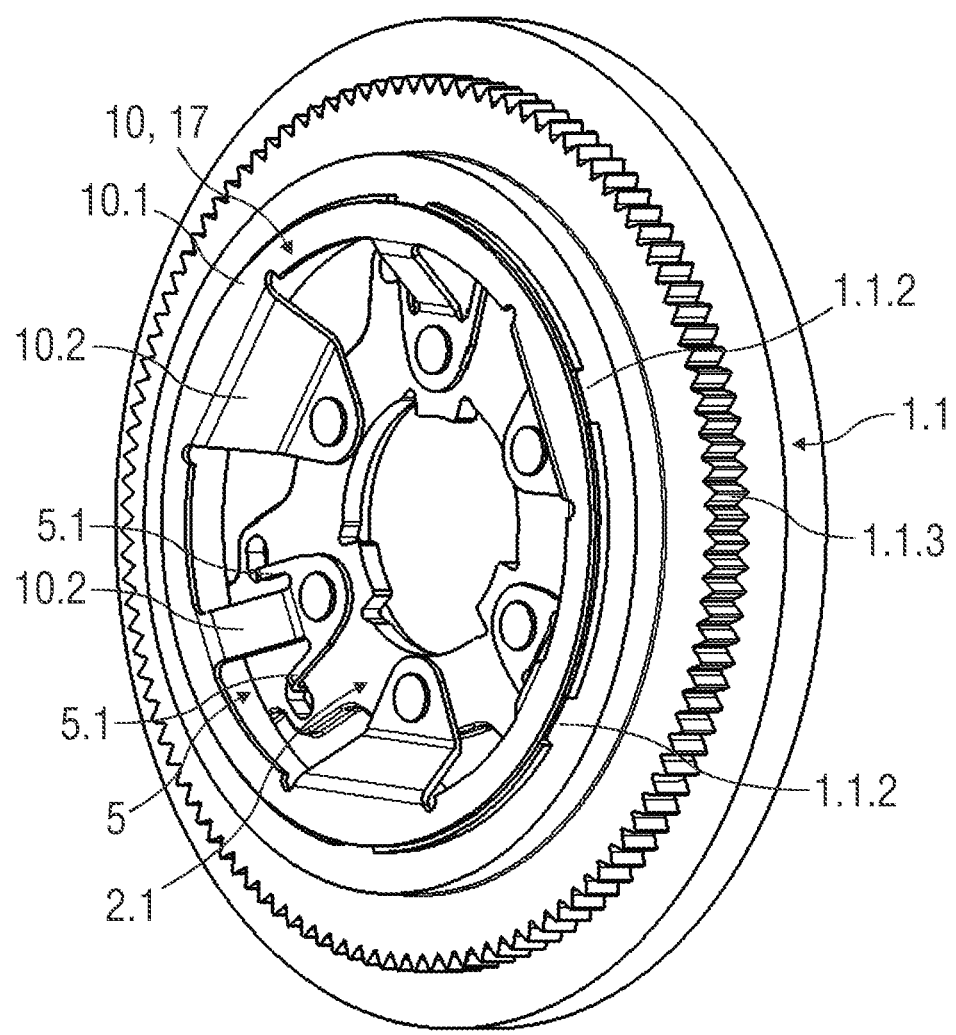

FIG. 16 schematically shows, in the assembled state, the adjustment fitting 1 without cover 8.1 and with the bearing element 10, which is designed as a brake device 17 in the form of a corrugated disk. For this purpose, the bearing element 10 comprises, for example, multiple brake arms 10.2 directed axially and radially inward from the ring 10.1. These brake arms 10.2 are fixedly connected to the carrier 2.1 under preload, in particular by riveting. In this way, the carrier 2.1 is held under preload on the first fitting part 1.1 (fitting part fixed to the seat). The brake device 17 of the gearing unit 2 makes it possible in a simple manner to safeguard an overtravel of the locking elements 3.2 for reliable unlocking thereof before an adjustment movement of the backrest R.

For holding the locking element guide 2.2 in centred fashion, the bearing element 10 furthermore comprises the integrated spring arms 5.1, by means of which the locking element guide 2.2 is held in spring-preloaded and centered fashion on the carrier 2.1 in the assembled state of the adjustment fitting 1.

The carrier disk 6 and the positioning spring 5 are in this embodiment formed as a bracing element 13 (FIG. 7) for bracing the play-eliminating elements 3.3. The bracing element 13 comprises spring arms 13.1, which press the play-eliminating elements 3.3 together in an analogous manner.

The carrier disk 6 or the bracing element 13 furthermore serve as a cage for the radial and axial mounting and/or fixing of all internal components of the adjustment fitting 1, in particular the toothed wheels 2.3 and the locking elements 3.2.

The holder 7 is L-shaped and serves to hold the external components of the adjustment fitting 1, in particular the fitting parts 1.1, 1.2, axially.

The gearing unit 2 and the locking unit 3 are held and coupled to one another at the inside by means of the carrier 2.1 and the carrier disk 6 in addition to the fitting parts 1.1, 1.2. Such an arrangement forms a double carrier and ensures a stable and solid structure. In particular, the carrier 2.1 and the carrier disk 6 may be held together and connected to one another for example by means of press-in threaded bolts or screw connections or other suitable means. Here, the bolts may also serve as bearings for the toothed wheels 2.3 and the play-eliminating elements 3.3.

Figure 17:
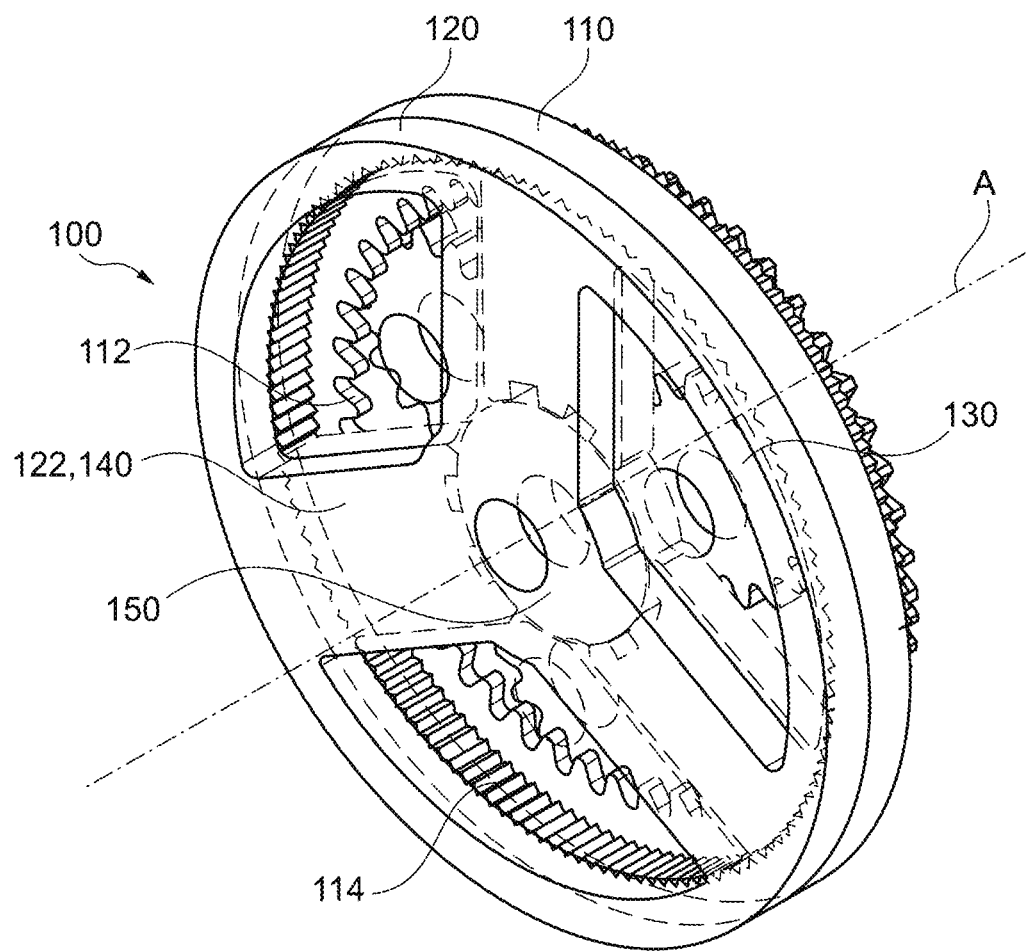
Figure 18:
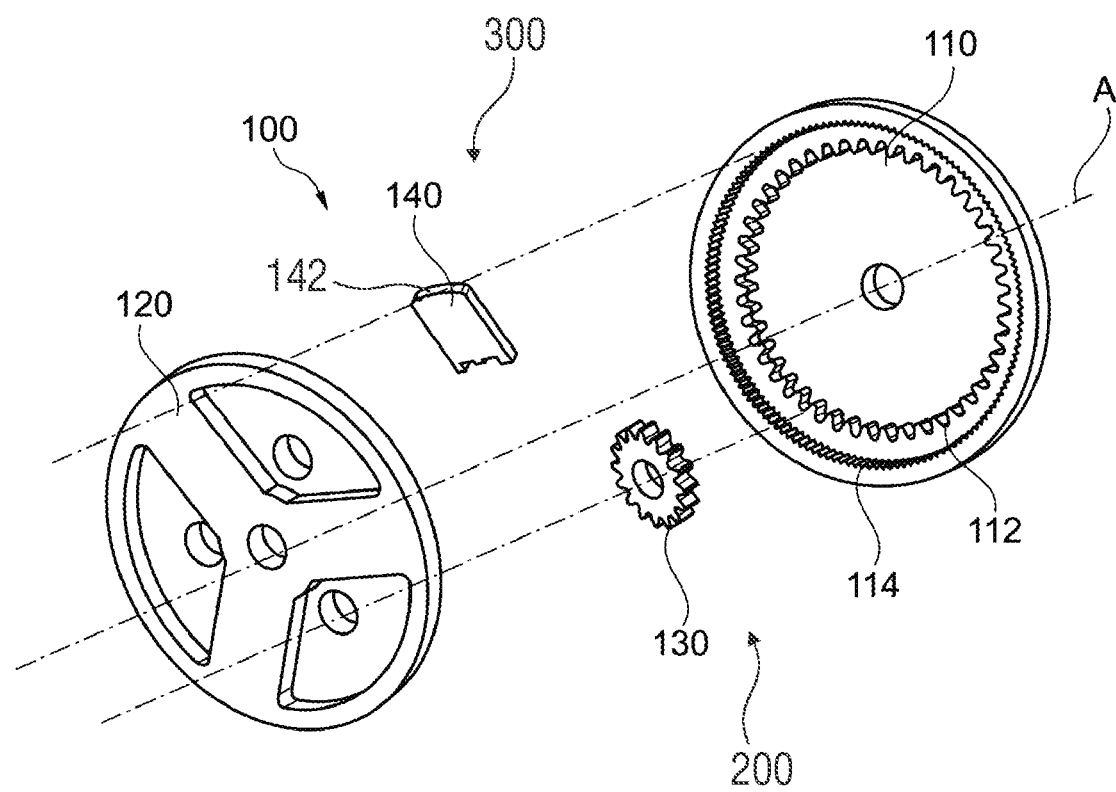

FIGS. 17 and 18 show an adjustment fitting 100 according to a further general exemplary embodiment for the separate configuration of gearing unit 200 and locking unit 300. The adjustment fitting 100 combines a geared fitting in the form of a planetary gearing and a detent locking means.

The adjustment fitting 100 has a first fitting part 110, a second fitting part 120, three toothed wheels 130 and three locking elements 140. The first fitting part 110 and the second fitting part 120 are substantially disk-shaped, wherein the first fitting part 110 is slightly pot-shaped. The first fitting part 110 and the second fitting part 120 are, radially at the outside, mounted rotatably with respect to one another about a central axis of rotation A by means of a clasp ring (not illustrated in the figures). Such a clasp ring is known for example from DE 10 2009 041 492 A1. The toothed wheels 130 and the locking elements 140 are arranged in a receiving space formed by the fitting parts 110, 120.

The first fitting part 110 is for example fixedly connectable to a seat substructure SU of a vehicle seat S, and the second fitting part 120 is fixedly connectable to a backrest R of the vehicle seat S. The first fitting part 110 is alternatively connectable to a backrest R of a vehicle seat S, and the second fitting part 120 is connectable to the seat substructure SU of the vehicle seat 5.

Unless otherwise described, the terms "radial", "axial" and "in the circumferential direction" relate to the central axis of rotation A of the adjustment fitting 100. "Radial" means perpendicular to the central axis of rotation A. "Axial" means in the direction of or parallel to the central axis of rotation A.

The first fitting part 110 has a first internal toothing 112 and a second internal toothing 114. The first internal toothing 112 is arranged axially offset with respect to the second internal toothing 114. The second internal toothing 114 is preferably of finer configuration than the first internal toothing 112. The first internal toothing 112 forms a ring gear of the planetary gearing of the geared fitting. The second internal toothing 114 is a constituent part of the detent locking means.

The second fitting part 120 acts both as a planet carrier of the planetary gearing and as a guide component of the detent locking means. The three toothed wheels 130 act as planet gears of the planetary gearing, are each rotatably mounted on one of a total of three bearing journals of the second fitting part 120, which acts as a planet carrier, and are in tooth meshing engagement with the first internal toothing 112. The three bearing journals thus form three further axes of rotation A for in each case one toothed wheel 130, wherein these further axes of rotation A are arranged so as to be distributed uniformly about the central axis of rotation A and run parallel thereto. In the present case, the bearing journals of the planet carrier are arranged so as to be distributed about the central axis of rotation A by 120° with respect to one another.

A sun gear mounted so as to be rotatable about the central axis of rotation A relative to the fitting parts 110, 120 is not illustrated in FIGS. 17 and 18. The sun gear is preferably a pinion connected directly or via additional components to an output shaft of an electric motor, in particular geared motor, which is likewise not illustrated in FIGS. 17 and 18. The first fitting part 110, in the form of a ring gear, the second fitting part 120, in the form of a planet carrier, the toothed wheels 130, acting as planets, and the sun gear form the planetary gearing. The second fitting part 120 is furthermore formed as a guide component of the detent locking means. For this purpose, the second fitting part 120 has three guide channels 122 for in each case one of the three locking elements 140. The locking elements 140 are each guided movably in a radial direction in relation to the central axis of rotation A in an associated guide 122. The locking elements 140 each have a toothing 142 radially on the outside, which toothing 142 can be brought into tooth meshing engagement with the second internal toothing 114 of the first fitting part 110. For this purpose, the locking elements 140 can, in a manner known per se, be moved in controlled fashion into the second internal toothing 114 and moved in controlled fashion out of the second internal toothing 114 by means of an eccentric 150 which is pivotable about the central axis A. The eccentric 150 may be a constituent part of an eccentric assembly which has a control disk for the targeted radially inward movement of the locking elements 140. When the locking elements 140 guided in the second fitting part 120 are in tooth meshing engagement with the second internal toothing 114 of the first fitting part 110, the first fitting part 110 and the second fitting part 120 are locked together such that no relative rotation about the central axis of rotation A is possible.

A torque introduced into the sun gear is transmitted via the toothed wheels 130 to the second fitting part 120 (planet carrier). The planetary gearing of the adjustment fitting 100 has the main function of an electric backrest adjuster and serves for the adjustment of the backrest. The teeth, in particular their number, shape and/or dimensions, of the toothings of this planetary gearing may be designed, constructed and optimized for a high-speed adjustment function. Idle and control travels (not illustrated in FIGS. 17 and 18) that act in each case between an output shaft of the geared motor, the eccentric 150 of the detent locking means and the sun gear are configured such that, when the geared motor is actuated, the movement of the output shaft firstly, in particular after a small amount of rotational play, causes the eccentric 150 to be rotated, whereby the locking elements 140 are pulled radially inward out of tooth meshing engagement with the second internal toothing 114, such that the first fitting part 110 and the second fitting part 120 are no longer locked together. During further rotation of the output shaft, a part of the output shaft comes into contact with a driving geometry on the sun gear and drives the sun gear. Owing to an imperatively required bilateral drive movement of the adjustment fitting 100 and the requirement to automatically achieve a play-free braced overall situation of the adjustment fitting 100 when the geared motor is deactivated, it is advantageous, when using a self-locking geared motor, that the geared motor returns to a "zero position" or "middle position" after the ending of the rotational movement in order to be able to run through the next adjustment process in any direction as described above. Corresponding control may be implemented by means of an electrical controller. In principle, the described functional sequence (the movement to the middle position) may however also be realized purely mechanically using clutch units, springs, idle travels and disconnections between the components involved and with the use of a non-self-locking geared motor.

Figure 19:
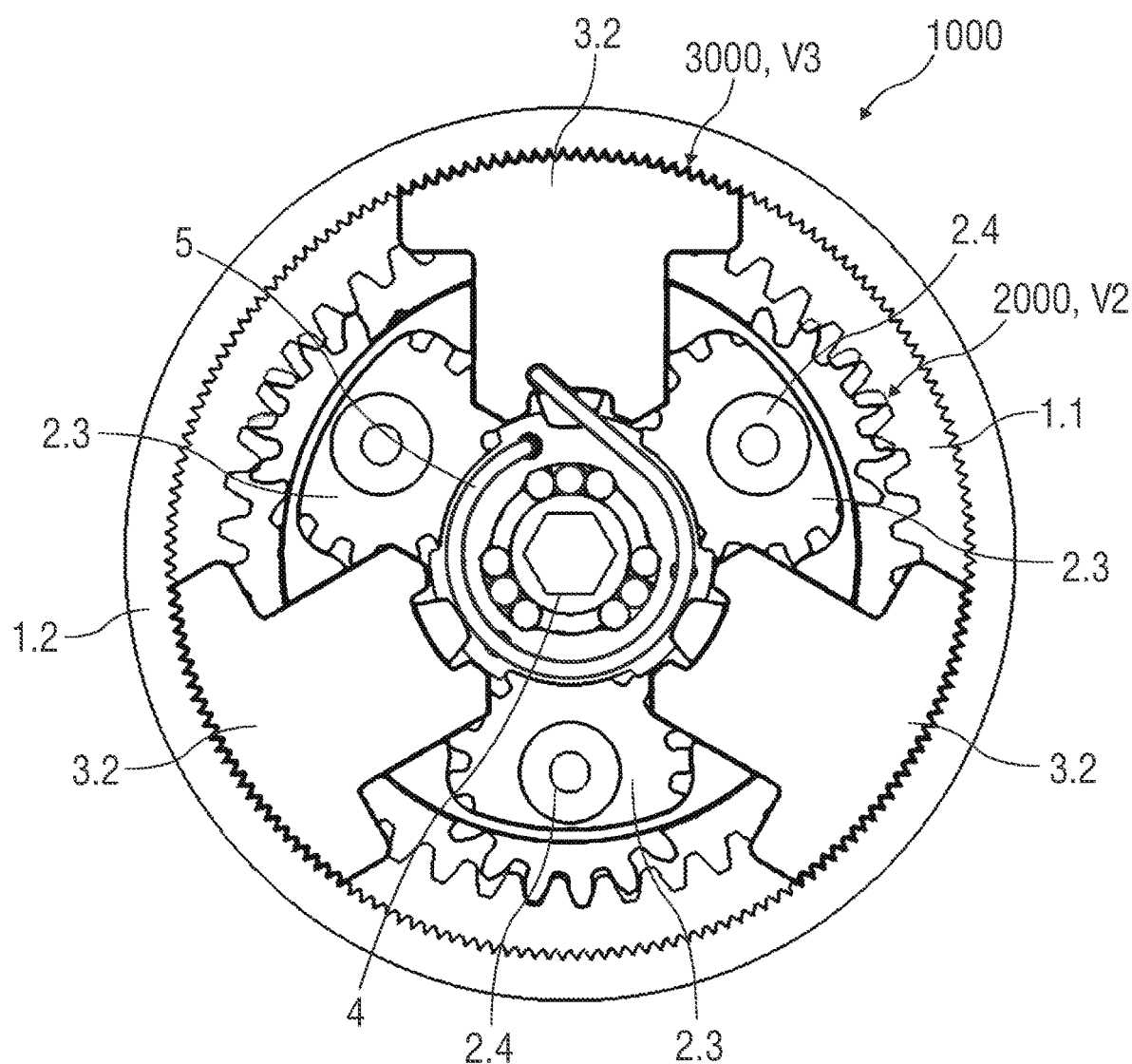

FIG. 19 schematically shows a view of an alternative adjustment fitting 1000 with radially offset toothings V2 and V3 for the gearing unit 2000 and the locking unit 3000.

The mode of operation and the construction substantially correspond to the mode of operation and the construction of the adjustment fitting 1 or 100 according to FIGS. 1 to 18.

Furthermore, the invention may be implemented by means of further embodiments of components of an adjustment fitting 1.

In modifications of the further exemplary embodiments, further mechanical operating principles are used, such as wrap spring clutches, axially acting, geometrically or force-controlled tooth clutches etc. This results overall in a large number of possible design variants for the main functional elements of gearing, detent locking mechanism and play-eliminating means. A transfer of further basic functions, wherein a control logic is mentioned here merely by way of example, may take place in various ways between the main functional elements—gearing unit 2 and locking unit 3. For example, the gearing unit 2 (the gearing stage) can realize the freedom from play by means of wedge systems known per se, or toothings that are braced against one another, if at the same time the detent toothing acting in parallel allows the transmission of useful loads into the gearing by introducing an idle travel into the power flow (toothing, guidance, . . . ). In this case, in the event of a crash load, a slight deformation of the gear stage would firstly occur, followed then by tooth meshing engagement of a detent toothing with a correspondingly higher load-bearing capacity. Also conceivable, however, is the different subdivision, in the case of which—in the same way as in detent-type fittings known from the prior art—the detent toothing both eliminates play and accommodates the crash loads, and the upstream planetary stage—coupled with idle travel—accommodates forces/torques actually only during the electrical adjustment process.

The features which are disclosed in the above description, in the claims and in the figures can be of significance both individually and in combination for the implementation of the invention in its various embodiments, in so far as they remain within the scope of protection of the claims.

Although the invention has been described in detail in the figures and in the above illustration, the illustrations are to be understood as being illustrative and exemplary and non-restrictive. In particular, the selection of the proportions of the individual elements illustrated in the drawing is not to be interpreted as being necessary or restrictive. Furthermore, the invention is in particular not restricted to the exemplary embodiments discussed. Further variants of the invention and the embodiment thereof emerge to a person skilled in the art from the preceding disclosure, from the figures and from the claims. The use of the indefinite article does not rule out a multiplicity. A single device may perform the functions of several of the units or devices mentioned.

LIST OF REFERENCE DESIGNATIONS

1 Adjustment fitting
1.1 First fitting part
1.1.1 First internal toothing
1.1.2 Support
1.1.3 External toothing
1.1.4 Receptacle
1.2 Second fitting part
1.2.1 Second internal toothing
1.2.2 External toothing
2 Gearing unit
2.1 Carrier
2.1.1 Internal contour
2.1.2 Fastening element
2.1.3 Passage opening
2.1.4 Fastening means
2.1.5 Inner ring contour
2.2, 20.2 Locking element guide
2.2.1 Radial guide
2.3 Toothed wheel
2.3.1 External toothing
2.4 Bearing bolt
2.4.1 First axial bearing end
2.4.2 Second axial bearing end
2.4.3 Bearing body
2.5 Receptacles
3 Locking unit
3.1 Unlocking unit
3.1.1 Slot
3.2 Locking element
3.2.1 Toothing
3.2.1*a*, 3.2.1*b* Radial toothed ring
3.2.2 Cam
3.2.3 Guide pin
3.2.4 Web
3.3 Play-eliminating element
3.3.1 Bracing contour
3.3.2 Opening contour
4 Control mechanism
4.1 External contour
4.1.1 Projection
4.2 Internal contour
4.3 Guide pin
5, 5' Positioning spring
5.1 Spring arms
5.2 Bolt
6 Carrier disk
7 Holder
7.1 Recess
8.1, 8.2 Cover
8.1.1, 8.2.1 Fastening element
9 Washer
10, 10' Bearing element
10.1 Ring
10.2 Brake arm
11 Drive
12 Flange
12.1 Upper flange
12.2 Lower flange
13 Bracing element
13.1 Spring arm
14 Transmission tube
15 Motor
16 Opening
17 Brake device
100, 1000 Adjustment fitting
110 First fitting part
112 First internal toothing
114 Second internal toothing
120 Second fitting part
122 Guide
130 Toothed wheel, planet
140 Locking element
142 Toothing
150 Eccentric
200, 2000 Gearing unit
300, 3000 Locking unit A Axis
eUR Counterclockwise
K1, K2 Contact region
OS Initial or open position
R Backrest
S Vehicle seat
SU Seat substructure
UR Clockwise direction
V2, V3 Toothing
VP Locking position
Z1, Z2, Z Tooth

The invention claimed is:

1. An adjustment fitting for a vehicle seat for adjusting an inclination of a backrest of the vehicle seat, comprising:
   a first fitting part connectable to a seat substructure of the vehicle seat,
   a second fitting part pivotable about an axis relative to the first fitting part and connectable to the backrest of the vehicle seat,
   wherein the first fitting part and the second fitting part are constituent parts both of a gearing unit of the adjustment fitting and of a locking unit of the adjustment fitting,
   wherein the gearing unit comprises a control mechanism that is coupled to the locking unit such that, in a locking position of the adjustment fitting, both the gearing unit and the locking unit mesh with the fitting parts.

2. The adjustment fitting as claimed in claim 1, wherein the backrest is coupled to the seat substructure via the gearing unit when the locking unit is open.

3. The adjustment fitting as claimed in claim 1, wherein a direct drive is coupled to the gearing unit.

4. The adjustment fitting as claimed in claim 1, wherein an unlocking mechanism is provided and configured such that, when the control mechanism is actuated by the drive, said unlocking mechanism releases the locking unit both in the case of a movement clockwise and in the case of a movement counterclockwise.

5. The adjustment fitting as claimed in claim 1, wherein the gearing unit and the locking unit are formed separately from one another and are coupled to one another in terms of movement.

6. The adjustment fitting as claimed in claim 1, wherein the first fitting part has at least one first internal toothing and the second fitting part has at least one second internal toothing, wherein both the gearing unit and the locking unit are configured to mesh both with the first internal toothing and with the second internal toothing.

7. The adjustment fitting as claimed in claim 1, wherein the locking unit comprises a number of locking elements, each of which has two radial toothed rings which are arranged axially adjacent to one another.

8. The adjustment fitting as claimed in claim 7, wherein the radial toothed rings of the respective locking element are configured such that in each case only one tooth or a plurality of teeth of the respective radial toothed ring meshes with the associated internal toothing in the engaged state.

9. A vehicle seat having said at least one adjustment fitting as claimed in claim 1.

10. An adjustment fitting for a vehicle seat for adjusting an inclination of a backrest of the vehicle seat, comprising:
    a first fitting part connectable to a seat substructure of the vehicle seat,
    a second fitting part pivotable about an axis relative to the first fitting part and connectable to the backrest of the vehicle seat,
    wherein the first fitting part and the second fitting part are constituent parts both of a gearing unit of the adjustment fitting and of a locking unit of the adjustment fitting,
    wherein the first fitting part has at least one first internal toothing and the second fitting part has at least one second internal toothing, wherein both the gearing unit and the locking unit are configured to mesh both with the first internal toothing and with the second internal toothing.

11. An adjustment fitting for a vehicle seat for adjusting an inclination of a backrest of the vehicle seat, comprising:
    a first fitting part connectable to a seat substructure of the vehicle seat,
    a second fitting part pivotable about an axis relative to the first fitting part and connectable to the backrest of the vehicle seat,
    wherein the first fitting part and the second fitting part are constituent parts both of a gearing unit of the adjustment fitting and of a locking unit of the adjustment fitting,
    wherein the locking unit comprises a number of locking elements, each of which has two radial toothed rings which are arranged axially adjacent to one another.

* * * * *